United States Patent [19]

Spigarelli et al.

[11] 4,401,035
[45] Aug. 30, 1983

[54] CONTROL DEVICE FOR MULTIPLE UNIT LOCOMOTIVE SYSTEMS

[75] Inventors: Rudolph D. Spigarelli, Shreveport, La.; John L. Aker; Fred M. Berry, both of Johnson County, Kans.

[73] Assignee: Kansas City Southern Railway Company, Kansas City, Mo.

[21] Appl. No.: 165,724

[22] Filed: Jul. 3, 1980

[51] Int. Cl.[3] ............................................. B60L 15/32
[52] U.S. Cl. ...................................... 105/61; 364/426
[58] Field of Search ................. 105/61, 62; 340/172.5, 340/424, 426, 431; 246/182 R, 182 C, 186 R, 187 R

[56] References Cited

U.S. PATENT DOCUMENTS

| | | | |
|---|---|---|---|
| 3,543,112 | 11/1970 | Richmond | 318/146 |
| 3,643,252 | 2/1972 | Roberts | 340/706 |
| 3,651,765 | 3/1972 | Grundy | 105/61 |
| 3,696,758 | 10/1972 | Godinez | 105/61 |
| 3,698,325 | 10/1972 | Grundy | 105/61 |
| 3,790,778 | 2/1974 | Oster | 246/182 C |
| 3,867,647 | 2/1975 | Callahan | 307/233 A |
| 3,891,792 | 6/1975 | Kimura | 178/5.8 R |
| 3,952,829 | 4/1976 | Gray | 180/105 E |
| 3,969,654 | 7/1976 | Grundy | 246/182 R |
| 4,000,872 | 1/1977 | Grundy | 246/182 R |
| 4,015,245 | 3/1977 | Mercurio et al. | 340/172.5 |
| 4,042,810 | 8/1977 | Mosher | 235/150.2 |
| 4,079,449 | 3/1978 | Mercurio | 364/200 |
| 4,118,774 | 10/1978 | Franke | 364/431 |
| 4,138,723 | 2/1979 | Nehmer | 364/424 |
| 4,234,922 | 11/1980 | Wilde et al. | 364/426 |

FOREIGN PATENT DOCUMENTS

| | | | |
|---|---|---|---|
| 281640 | 11/1927 | United Kingdom | 105/61 |
| 393275 | 5/1933 | United Kingdom | 105/61 |
| 519891 | 4/1940 | United Kingdom | 105/61 |
| 808657 | 2/1959 | United Kingdom | 105/61 |
| 1007193 | 10/1965 | United Kingdom | 105/61 |
| 1056810 | 2/1967 | United Kingdom | 105/61 |
| 1081602 | 8/1967 | United Kingdom | 105/61 |
| 1099140 | 1/1968 | United Kingdom | 105/61 |
| 1133075 | 11/1968 | United Kingdom | 105/61 |

*Primary Examiner*—Richard A. Bertsch
*Attorney, Agent, or Firm*—Kokjer, Kircher, Bradley, Wharton, Bowman & Johnson

[57] ABSTRACT

An electronic control system for automatically controlling the locomotive units of a multiple unit locomotive consist in a manner to maintain a selected speed of the consist with minimum fuel consumption. The control system includes a microprocessor and related hardware for each unit in the consist. Control and acknowledgement signals are transmitted among the locomotive units along a single train line wire to vary the output power of each unit among full power, half power and idle speed settings while maintaining the consist at the desired set speed. The hardware is arranged to direct the control and acknowledgement signals to the proper locomotive units while transmitting in both directions along the train line wire. The software for the microprocessors takes into account the acceleration and deceleration of the consist in adjusting the power output of the locomotive units.

22 Claims, 23 Drawing Figures

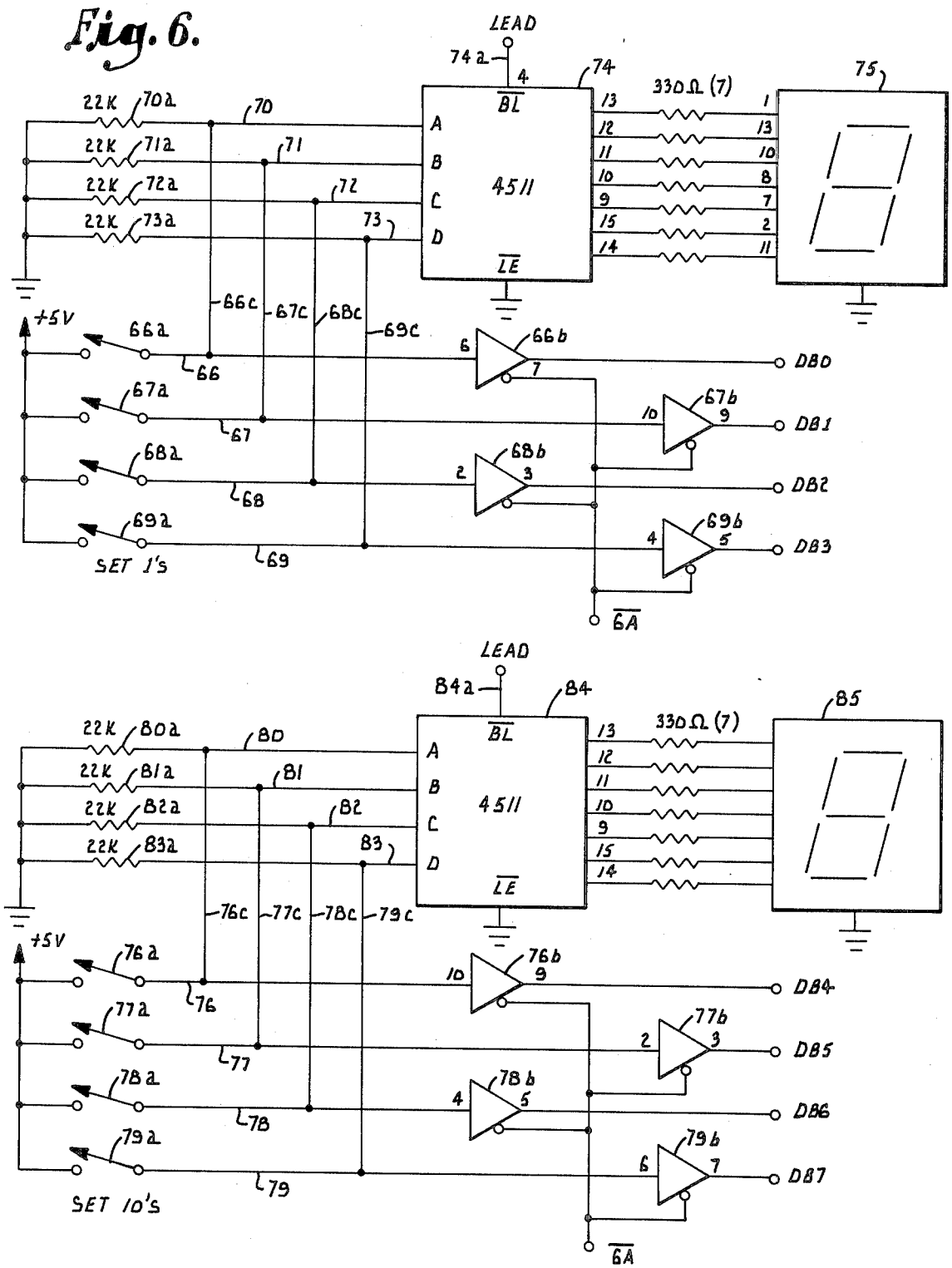

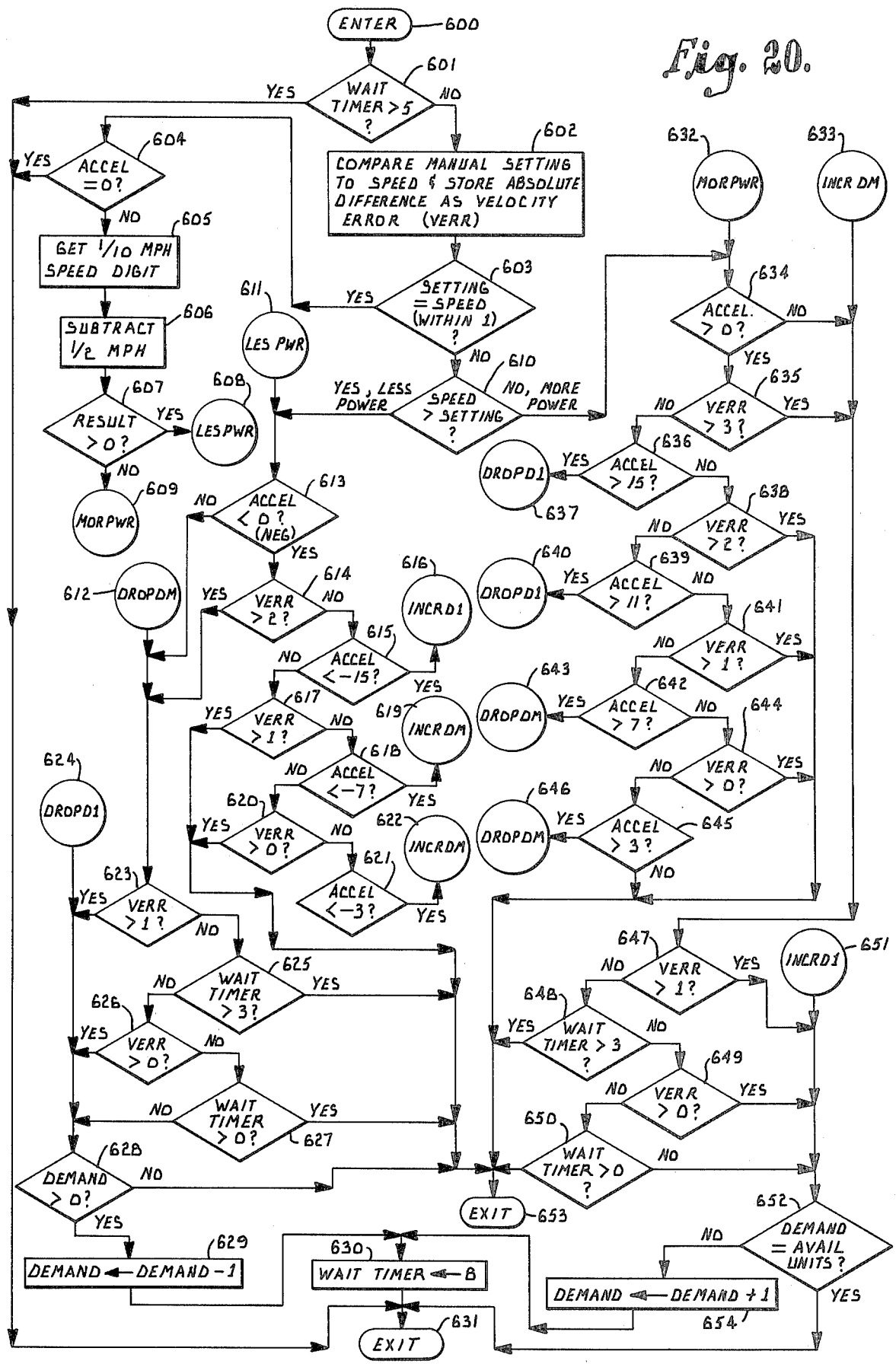

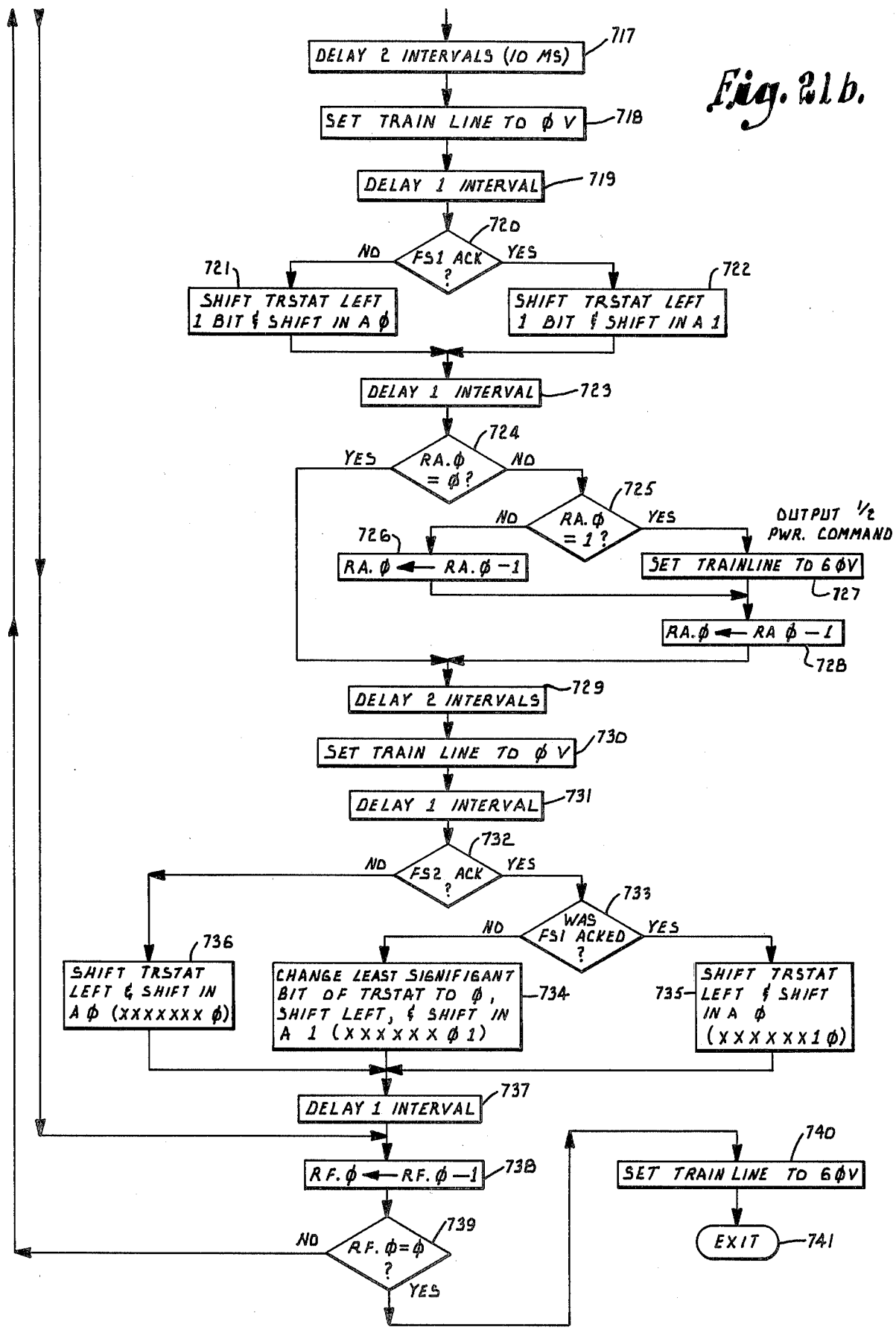

CONTROL DEVICE FOR MULTIPLE UNIT LOCOMOTIVE SYSTEMS

BACKGROUND AND SUMMARY OF THE INVENTION

This invention relates generally to diesel locomotives and deals more particularly with an improved control system which operates in a manner to increase the efficiency of the locomotives included in a multiple unit locomotive consist.

A typical locomotive system or consist includes a plurality of diesel locomotives which cooperate to provide the motive power for the train. The locomotives are mechanically coupled and are connected electrically with one another by a plurality of train line wires. One of the locomotives serves as a lead unit which controls the output power of each of the trail units in the system in accordance with the throttle setting of the lead unit. The locomotives normally operate at less than full power since full power is only required under conditions such as when a steep upgrade is encountered. Consequently, the locomotives all have the same throttle setting which is nearly always less than full throttle.

It has been found that maximum efficiency of a diesel locomotive occurs at full throttle or nearly full throttle. However, as indicated previously, the manner in which locomotive systems have been controlled in the past results in all of the locomotives operating at an intermediate or low throttle setting the vast majority of the time. Therefore, the locomotive consist operates at considerably less than peak efficiency. Due in large part to the rapidly increasing costs of diesel fuel, this inefficiency has taken on increased importance in recent years and much effort has been directed at attempting to increase the operating efficiency of multiple unit locomotive consists.

As indicated in U.S. patent application Ser. No. 102,271 which was filed by Rudolph D. Spigarelli on Dec. 10, 1979, now abandoned, the fuel consumption of a locomotive system can be substantially reduced by maintaining some of the locomotives at full throttle and cutting other units back to the throttle one or idle position. For example, instead of operating all six units of a locomotive consist at half power, the same total output power can be attained by operating three of the units at full power and the other three at idle speed. In this fashion, the overall efficiency of the consist is increased and the fuel consumption is decreased since three of the locomotives are operated at the maximum efficiency full throttle position while the other three locomotives are maintained at idle speed.

Although this arrangement can achieve substantial fuel savings, it is not wholly without problems. Perhaps most significantly, the engineer must manually operate the fuel saver device in the proper manner and at the proper times if it is to function effectively. This requires training of the engineers and willingness on their part to give up some of their control over the operation of the locomotive. In actual practice, many engineers resist using the device to the maximum extent, and its effectiveness suffers accordingly. Furthermore, it is necessary to properly set the set-up switches in each locomotive, and considerable inconvenience is involved in physically entering each locomotive for manual setting of the set-up switches. Also, one or more of the switches may be set incorrectly, and the fuel saver device will not operate properly.

The device shown in the aforementioned patent application is capable only of placing each locomotive either in the full throttle position or in the idle position. There is no intermediate throttle setting that can be achieved in the fuel save mode of operation. This can be a significant drawback in situations where the desired train speed cannot be achieved with a given locomotive unit at idle and yet excessive speed results if that locomotive is at full power. It is also common for the train speed to build up above the desired speed before the engineer thinks to activate the fuel saver device. Again, the device does not function in the manner intended and excessive fuel consumption results.

The present invention has as its primary object the provision of an improved control device for a multiple unit locomotive consist which automatically controls the power output of the individual locomotive units in a manner to maintain the consist at maximum operating efficiency. The automatic operation of the device is of great benefit since the possibility of human error and resistance to use of the device is substantially eliminated.

Another object of the invention is to provide a locomotive control device of the character described which accurately maintains the train speed at the desired set speed.

Still another important object of the invention is to provide a control device of the character described which controls the power output of each locomotive in incremental steps. Preferably, the control device operates to selectively reduce the throttle settings of the individual locomotives either to half throttle or to idle speed, thereby allowing the locomotive consist to accurately maintain virtually any set speed. Consequently, the locomotive system speed is more smoothly maintained than if there were no intermediate half power setting in the fuel save mode of operation.

A further object of the invention is to provide a control device of the character described which is well adapted for incorporation into the existing control circuitry of a conventional locomotive and which requires only minor modification of the existing circuitry.

An additional object of the invention is to provide a control device of the character described which uses only a single designated train line wire for transmitting control signals and which is arranged to permit transmission of the signals in both directions along the designated train line wire. In the latter regard, it is an important feature of the invention that the locomotive system can be physically reversed in its direction of movement, as during backing operations, without adversely affecting the control function of the device. The use of a single train line wire is important because the American Association of Railroads has specifically designated only one of the train line wires for use in connection with fuel conservation devices.

A still further object of the invention is to provide a control device of the character described which functions in a manner to automatically designate the lead locomotive unit and to differentiate it from the remaining or trail units. This is accomplished by detecting the position of an air brake cut-off valve which determines the position of a pressure switch and which in any event must be set in the "cut-in" position (pressure switch closed) for the lead unit and in the "cut-out" position (pressure switch open) for each trail unit. Accordingly, no separate operation such as setting of set-up switches is necessary in order to differentiate between the lead and trail units.

Yet another object of the invention is to provide a control device of the character described which senses when the set speed is being approached and acts in response in a manner to avoid significantly "over shooting" or "under shooting" the set speed.

Another object is to automatically determine the number of trail units in the locomotive consist in order to most effectively control the consist.

Still another object of the invention is to provide a control device of the character described wherein the control circuitry is contained within a sturdy control box in order to minimize the possibility of tampering or damage to the components of the circuitry.

Yet another object of the invention is to provide a control device of the character described which is adapted for use in conjunction with conventional tachometer type speed measuring devices of the type in widespread use on diesel locomotives.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 6 is a schematic circuit diagram of the speed set circuitry which permits the desired speed of the locomotive system to be set, visually displayed, and applied as input information to the microprocessor;

FIG. 20 is a detailed flow diagram of the software relating to the speed control logic; and FIGS. 21a and 21b together form a detailed flow diagram of the software relating to the train control logic.

DETAILED DESCRIPTION OF THE HARDWARE

Figure 1:
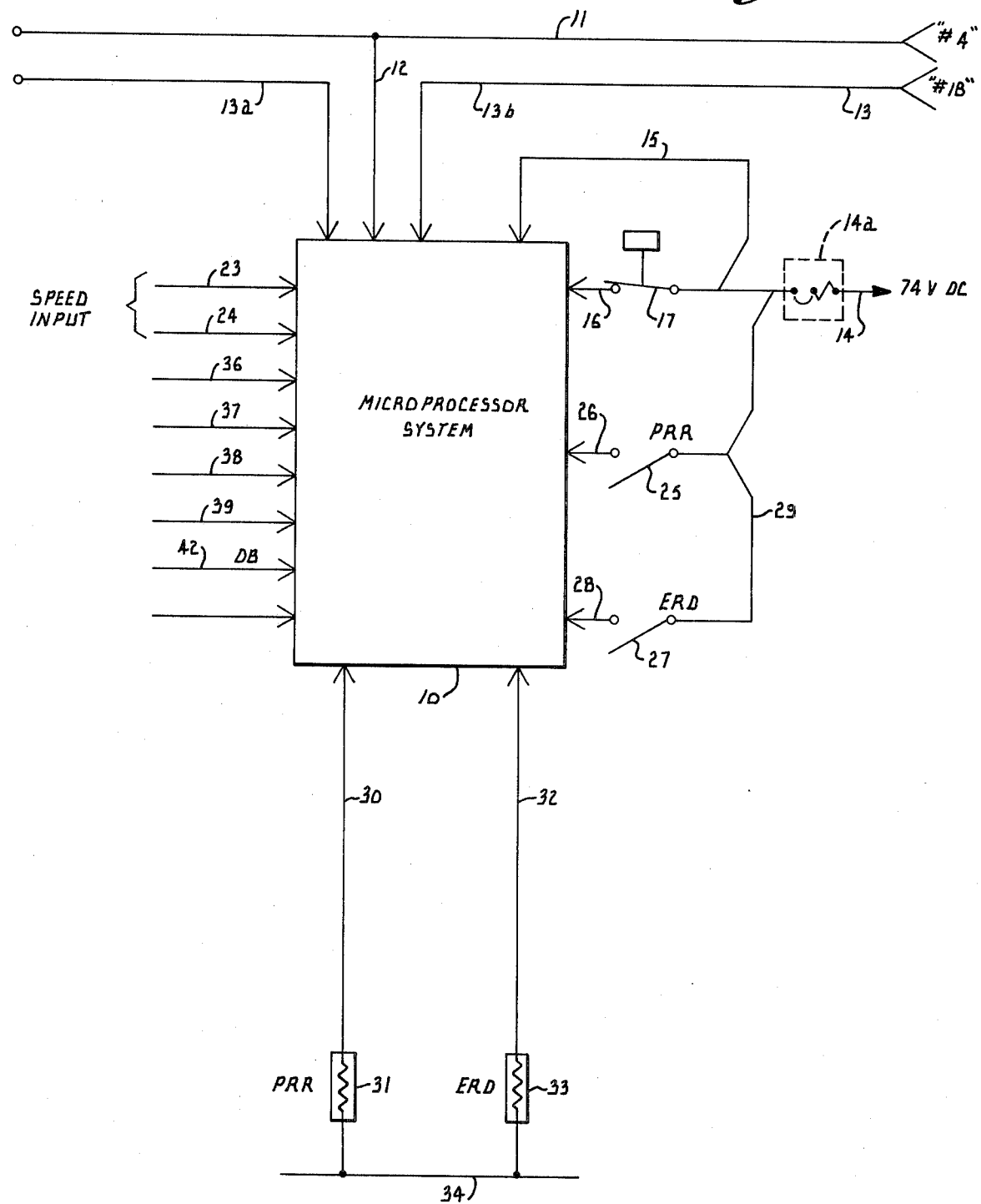
FIG. 1 is a schematic diagram showing the various inputs and control outputs of a microprocessor which is included in a control device constructed according to a preferred embodiment of the present invention.

Referring now to the drawings in detail, FIG. 1 is a schematic diagram showing a microprocessor system 10 and the various inputs thereto and the control outputs. The microprocessor system 10, under program control, is used to control the operation of the diesel locomotives included in a multiple unit locomotive system or consist having a plurality of locomotive units which cooperate to provide the motive power for propelling a train. Ordinarily, the throttle setting of each locomotive is controlled by the throttle setting of one of the locomotives designated as the lead unit. The remaining units are referred to as trail units. In other words, each locomotive in the consist is set at the same power level in normal operation, and that power level is determined by the throttle setting of the lead unit. Since each diesel locomotive operates at peak efficiency at or near the full throttle setting and the locomotive system operates at considerably less than full power the vast majority of the time, peak efficiency is not achieved and the fuel consumption is much greater than would occur at peak efficiency operation.

The present invention is directed to a control system for the locomotive consist which maintains the consist at or near peak operating efficiency at all speed settings of the consist. In accordance with the invention, each diesel locomotive in a multiple unit locomotive system is equipped with a microprocessor system 10 which may incorporate an RCA 1802 COSMAC microprocessor. The "No. 4" train line wire 11 which is supply common to all of the locomotive units is connected with each microprocessor by a connecting line 12. The "No. 18" train line wire 13, which the American Association of Railroads has designated for use in connection with fuel saving devices, leads into microprocessor system 10 in one direction 13a and out of the microprocessor system in the opposite direction as indicated at 13b. 74 volt DC power is supplied to each microprocessor along a conductor 14 having a 5 amp fuse 14a and along line 15 which connects with conductor 14 and with the microprocessor system.

One input is applied to microprocessor system 10 along a conductor 16 having a pressure switch 17 therein. The pressure switch 17 is controlled by the air brake system of the locomotive and is set in the closed position if the locomotive is a lead unit and in the open position if the locomotive is a trail unit, in accordance with the normal practice. Thus, if a signal is applied to the microprocessor along input line 16, the locomotive is a lead unit.

Throttle position inputs from the lead locomotive are applied to the microprocessor on lines 18–21, while the condition of the dynamic brake is applied as an input on line 22. Speed information from the speed tachometer is provided as an input on lines 23 and 24. The condition of the relay contact 25 of a relay referred to as a power reduction relay is input to the microprocessor on line 26. The condition of the contact 27 of a relay referred to as an engine run dropout relay is applied as an input on line 28. Relay contacts 25 and 27 are connected with one another and with line 14 by a conductor 29.

The control outputs of the microprocessor system 10 include a signal on line 30 which is applied to the relay coil 31 of the power reduction relay and another signal on line 32 which is applied to the coil 33 of the engine run dropout relay. Line 34 connects lines 30 and 32 with one another and completes the circuits which include coils 31 and 33. Energization of coil 31 causes its relay contact 25 to close, while contact 27 closes upon energization of coil 33, providing verification of proper relay operation.

Figure 4:
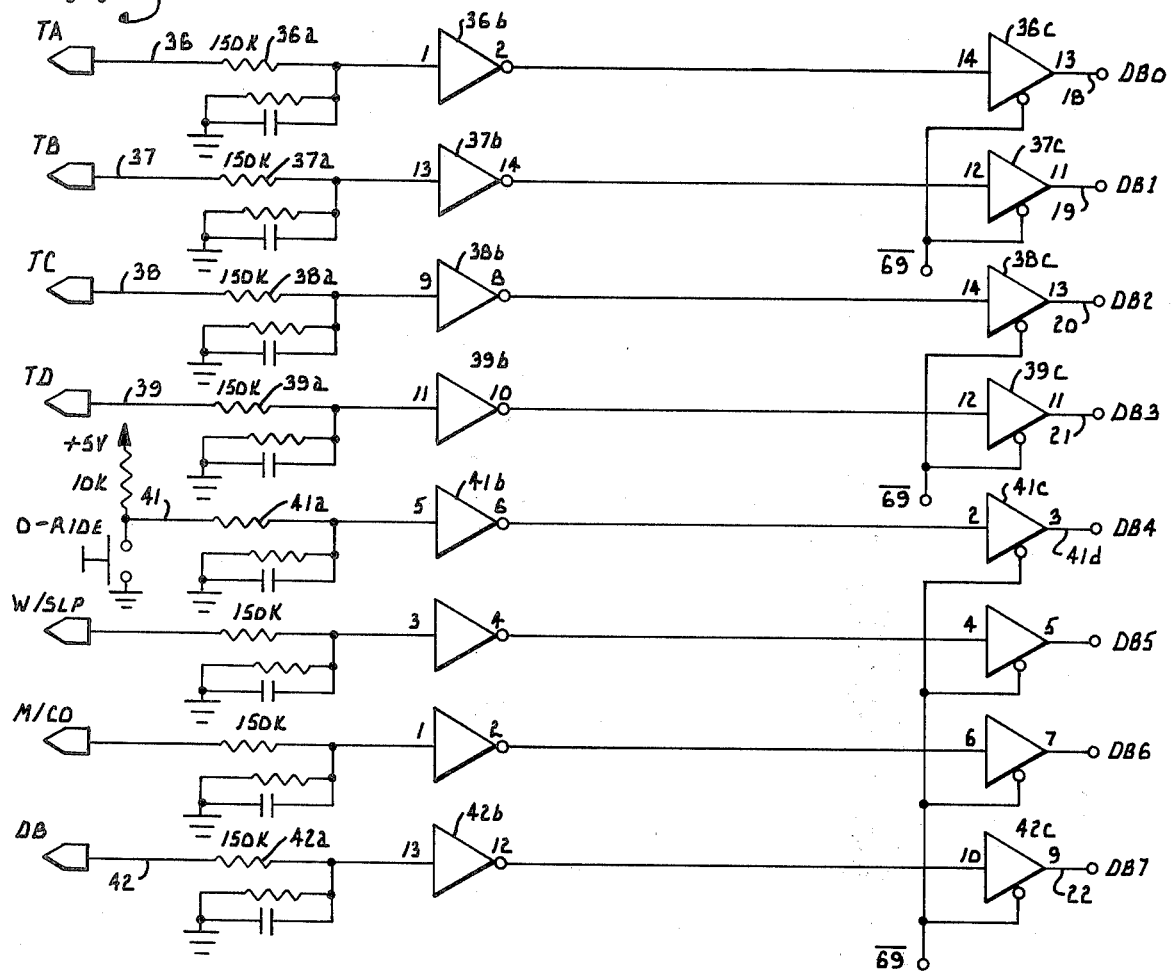
FIG. 4 is a schematic circuit diagram of the throttle line inputs, the dynamic brake input, and the manual over-ride pushbutton input to the microprocessor.

Turning now to the details of the input information supplied to microprocessor system 10, FIG. 4 illustrates four throttle lines 36–39 which are coded in a manner to provide information as to the throttle setting of the locomotive. The four throttle lines are coded such that they provide 8 information states corresponding to the 8 throttle positions of the locomotive. The No. 1 throttle position is essentially an idle position, while the throttle positions increase in power output as they ascend toward the full power No. 8 throttle setting. The signals applied to lines 36–39 are applied through 150K ohm resistors 36a–39a and are conditioned by Schmidt trigger inverters 36b–39b prior to encountering tri-state buffer circuits 36c–39c which are turned on when an output is present on the 69 output line of a decoder latch circuit 40 (see FIG. 2) associated with microprocessor 10a. The tri-state buffers 36c–39c are enabled on by the microprocessor when it calls for information as to the throttle line condition, and the buffers apply a signal indicative of the throttle line conditions to the lines 18–21 which connect to data bus terminals DB0, DB1, DB2 and DB3 of the microprocessor 10a.

Figure 2:
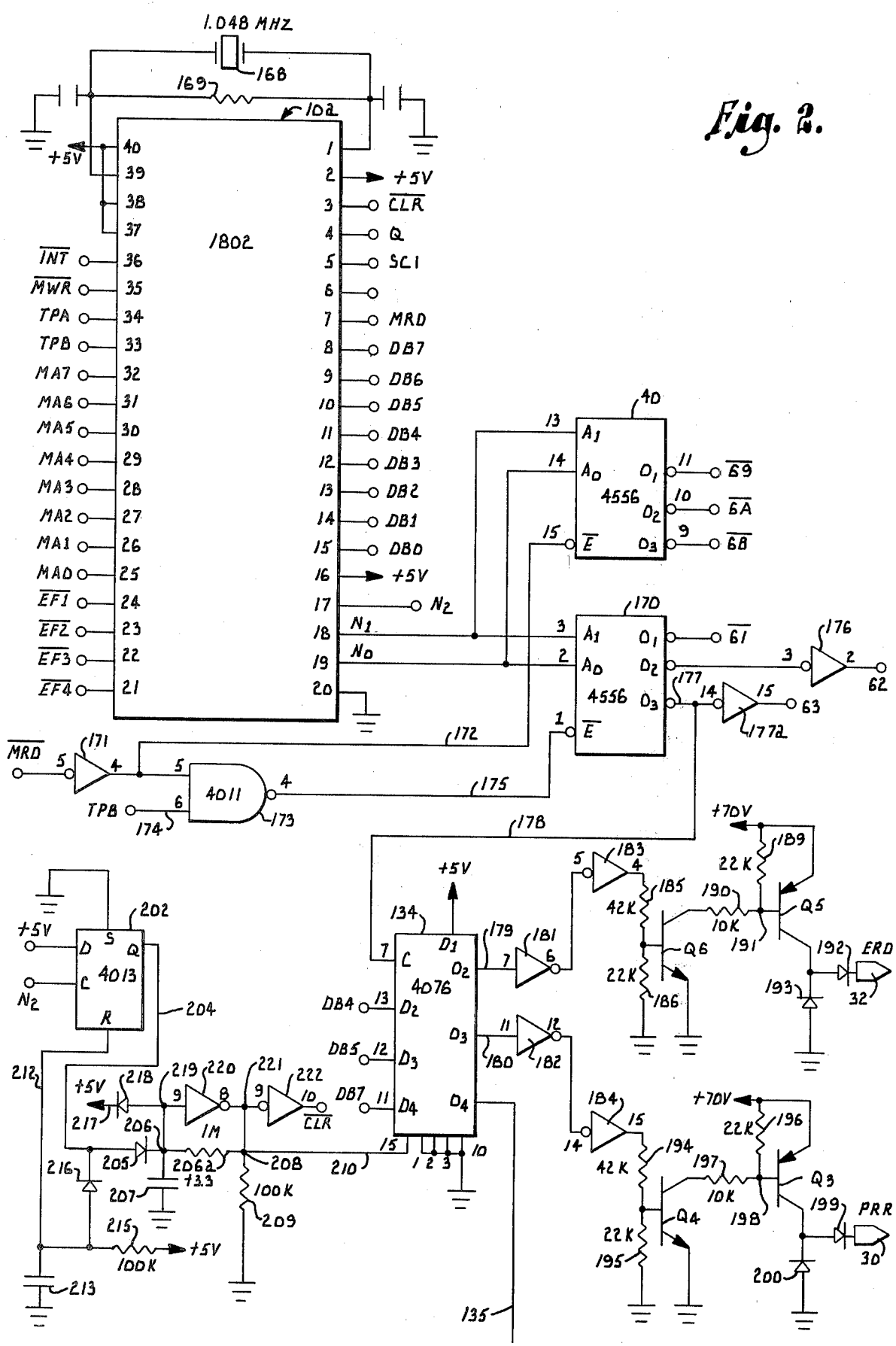
FIG. 2 is a schematic circuit diagram of the microprocessor and selected circuit components associated therewith.

The condition of the dynamic brake of the locomotive is similarly applied as an input to the microprocessor since it is not desirable to operate the locomotive consist in the fuel save mode if the dynamic brake is on. A signal indicative of the on or off condition of the dynamic brake is applied to line 42 and through a resistor 42a and inverter 42b to a tri-state buffer 42c which is enabled on by the microprocessor when an output is present on the 69 output line of circuit 40 (FIG. 2). The signal is then applied to line 22 and to data bus DB7 of the microprocessor. Override push button 41 is connected through resistor 41a, inverter 41b, 41c, to data bus 41d. This provides a manual override input to the microprocessor system and allows a temporary override of power reduction of the consist. Additional inputs to the microprocessor may include a motor cut-out signal applied to terminal M/CO and to the microprocessor on data bus line DB6, and a wheel slip signal applied to terminal W/SLP and to the microprocessor on data bus line DB5. These latter inputs are not employed in the preferred embodiment of the present invention, but they can be used if desired and are applied to the microprocessor in substantially the same manner as the throttle line signals and dynamic brake signal.

Figure 5:
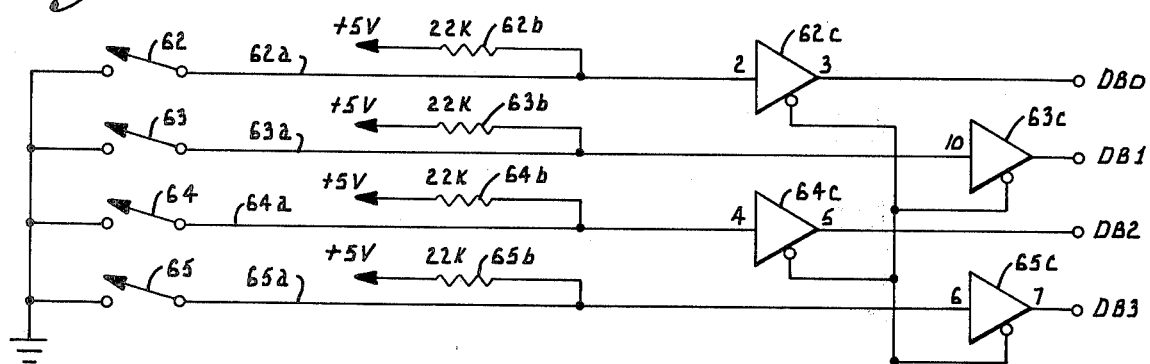
FIG. 5 is a schematic circuit diagram showing the speedometer calibration dip switch inputs to the microprocessor.
Figure 5A:
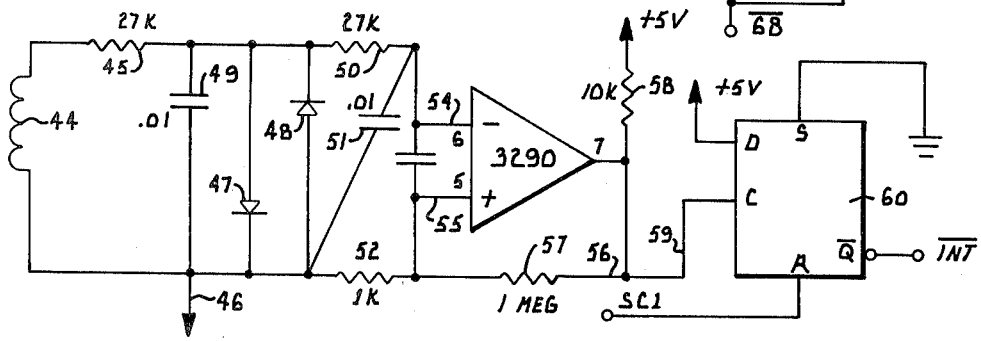
FIG. 5a is a schematic diagram of the tachometer speed input circuit to the microprocessor.

FIG. 5a illustrates a circuit which provides the speed information of the locomotive system to microprocessor 10a. Numeral 44 designates the secondary coil of a transformer, the primary coil of which is connected with a tachometer (not shown) in the form of a pulse generator which is associated with a wheel of the locomotive. The tachometer is an electromagnetic device of conventional construction which is geared to the wheel in a manner to provide 60 pulses for every revolution of the locomotive wheel. These pulse signals are isolated by the transformer, and are applied to secondary coil 44 and to a 27K ohm limiting resistor 45. The side of coil 44 opposite resistor 45 is tied to a common line 46 which is common to all of the electronics of the control device. A pair of diodes 47 and 48 are connected back to back in reverse, and a capacitor 49 acts to filter out noise. Another 27K ohm resistor 50 is included in the circuit, along with another capacitor 51 providing additional filtering.

The pulse signals are fed into a comparitor circuit 53 which functions in essentially the same manner as an operational amplifier with a high gain characteristic. The negative input side of comparitor 53 is connected at pin 6 with a conductor 54, while the positive input side is connected at pin 5 with another conductor 55 to common through 1K resistor. A positive feed back from the output pin 7 of comparitor 53 is provided on line 56 which includes a one megaohm resistor 57. A positive potential of 5 volts is applied to line 56 through a 10K ohm registor 58. In order to trigger the comparitor on, the voltage applied to its input negative side must be above common by an amount determined by the ratio of 1 megaohm to 1K ohm. Conversely, the negative voltage applied to the comparator input side must be below common by the same ratio to trigger the comparator off. Accordingly, the comparator does not undergo "jitter" and the signal is sharpened.

The output signal from pin 7 of comparator 53 is applied to line 59 and the clock input C of a flipflop circuit 60. A positive voltage is applied to the D input of circuit 60, and the sharp pulses applied to the clock input C trigger the flipflop circuit to its on condition and provide an output signal on the Q terminal which connects to the interrupt flag INT (pin 36) of the microprocessor 10a (See FIG. 2). The microprocessor is thus interrupted each time a pulse is received and it immediately resets flipflop circuit 60 for receipt of another pulse by applying a signal on the SC1 line (pin 5) of the microprocessor and to the reset pin R of the flipflop circuit. In this manner, the microprocessor counts the pulses on a timed basis to receive information as to the actual speed of the locomotive system as measured by the tachometer. It is contemplated that alternative methods of providing signals indicative of the speed may be used, such as radar, for example.

FIG. 5 illustrates a dip switch arrangement that can be used to calibrate the speed input circuit in order to compensate for wear on the locomotive wheels which causes a change in their circumference and thus a change in the ground speed relative to the rotational speed of the wheels. The FIG. 5 circuit is used to provide to the microprocessor, under program control, a selected number which is used to correlate the rotational speed of the wheels to the ground speed of the locomotive system. Four switches 62-65 may be set in closed and open positions in any combination to provide different constant numbers which recalibrate the speed input measurement when the wheel wears sufficiently to give inaccurate speed readings. Switches 62-65 are included in conductors 62a-65a which are grounded at one end and tied to +5 volts through 22K ohm resistors 62b-65b. Signals applied to lines 62a-65a are provided as inputs to tri-state buffer circuits 62c-65c which are turned on when an output signal appears on the 6B output terminal of circuit 40. When the buffers 62c-65c are enabled, their output signals are applied to the microprocessor on the data bus lines DB0, DB1, DB2 and DB3, respectively.

The set speed at which the locomotive system is to operate is provided as an input to the microprocesor by the circuits shown in FIG. 6. A positive potential of +5 volts is applied to four conductor lines 66-69 which have rotary BCD encoded switches 66a-69a, respectively, used to set the one's place of the desired speed setting. Pushbutton switches or thumb wheel switches may replace the rotary switches if desired. Lines 66-69 provide input signals to tri-state buffer circuits 66b-69b which are turned on when there is a signal on output terminal 6A of circuit 40 (FIG. 2). The output lines of buffers 66b-69b are connected to microprocessor 10 via the data bus lines DB0, DB1, DB2 and DB3, respectively. Each decimal digit which may be set in the one's place of the speed setting corresponds to a particular setting of switches 66a-69a according to a preselected code.

Signals indicative of the coded positions of switches 66a-69a are applied to conductors 66c-69c which connect with lines 70-73, respectively. Lines 70-73 are grounded through 22K ohm resistors 70a-73a and connect with the input terminals A-D of a 4511 decoder latch circuit 74 which decodes the input information and applies it to an LED 75. The outputs of decoder latch circuit 74 are applies to LED 75 through 333 ohm resistors, and the LED visually displays the one's place of the speed setting which is set according to the positions of switches 66a-69a.

The ten's place of the speed setting is set and visually displayed in substantially the same manner as the one's place, and the setting is provided to the microprocessor in the same manner. A 5 volt positive potential is applied to conductor lines 76-79 having switches 76a-79a which are used to set the ten's place of the speed setting. The positive voltage is applied through switches 76a-79a, when closed, to tri-state buffers 76b-79b which are enabled when an output signal is present on the 6A output line of circuit 40. The output lines of inverters 76b-79b are connected with data bus lines DB4, DB5, DB6 and DB7 of the microprocessor.

Conductors 76c-79c connect with lines 80-83, respectively, which are grounded through resistors 80a-83a. Lines 80-83 are input lines to terminals A-D of a decoder latch circuit 84 which has output lines leading through 330 ohm resistors to an LED 85. The LED provides a visual display of the digit which is set in the ten's place of the speed setting, as determined by the positions of switches 76a-79a. Each digit which may be set in the ten's place of the speed setting has a code corresponding with a particular pattern in which the switches 76a-79a are set. Preferably, the LEDs 85 and 75 are located side by side in the lead locomotive to visually display the speed setting.

It should be noted that the speed can be set only on the lead unit of the locomotive unit. Accordingly, the latch circuits 74 and 84 are turned on only when a signal is applied to their BL flags. This occurs only when the locomotive is a lead unit since only then is a signal present on the lead lines 74a and 84a which connect with the BL flags, as will be explained more fully.

Figure 3:
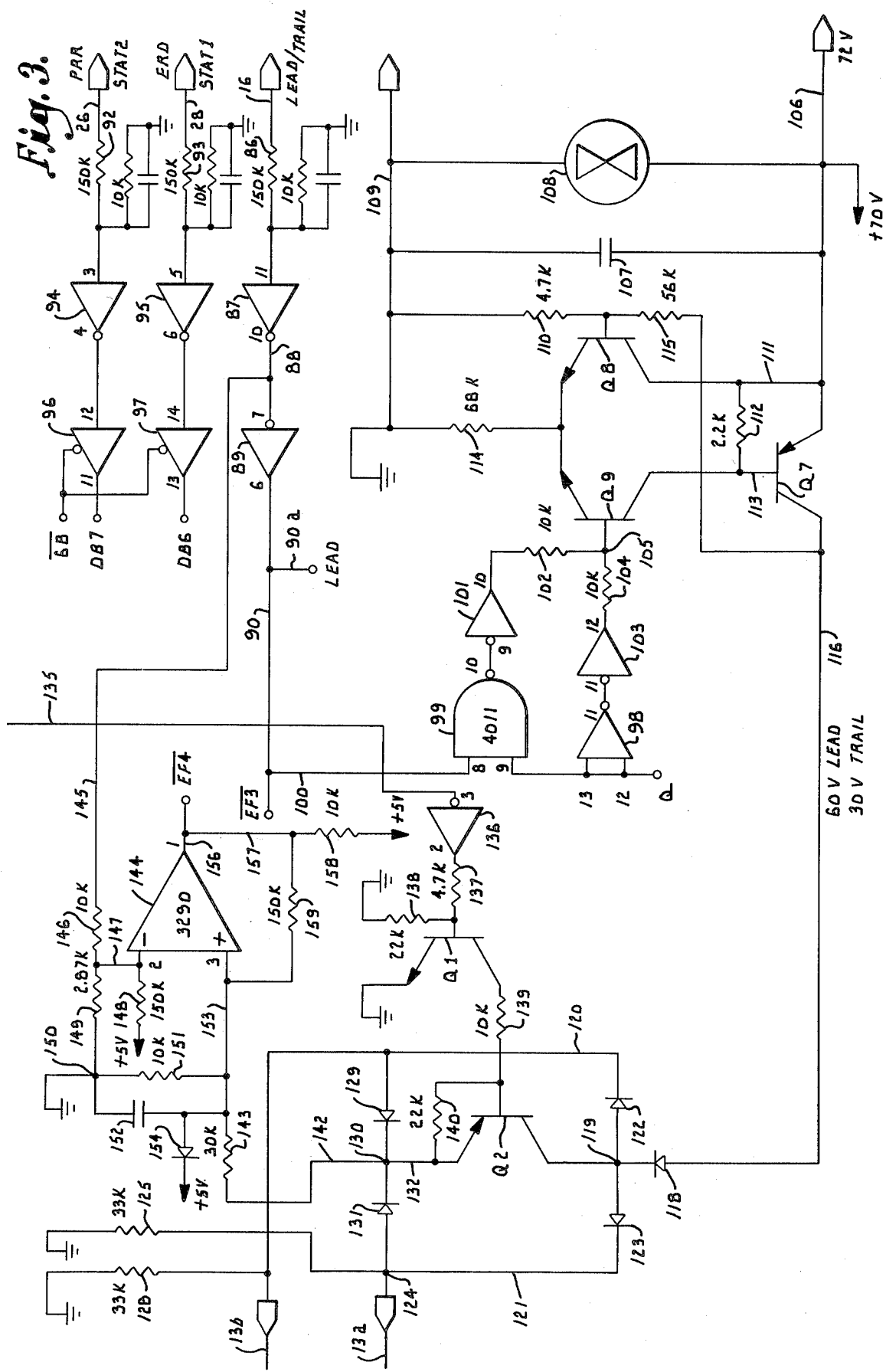
FIG. 3 is a schematic circuit diagram showing selected inputs to the microprocessor, along with the signalling circuit and a diode bridge circuit which permits transmission and receipt of control signals in both directions along the designated train line wire of a locomotive consist.

Referring now to FIG. 3, additional inputs to the microprocessor are provided on lines 16, 26 and 28, as previously indicated in connection with the description of FIG. 1. Line 16 includes the pressure switch 17 (FIG. 1) which is included in the air brake system of the locomotive and which is preset in the closed position if the locomotive is a lead unit and in the open position if the locomotive is a trail unit. Since the air switches must be properly set in any event, there is no separate procedure required in order to designate which locomotive is the lead unit and which are the trail units.

Line 16 includes a 150K ohm resistor 86 and a Schmidt trigger shaping circuit 87 having an output line 88 leading to an OR circuit 89. The output line 90 of the inverter circuit 89 connects with the EF3 input flag 22 of microprocessor 10 in order to provide the microprocessor with information as to whether the locomotive is a lead unit or a trail unit, thus directing the microprocessor to follow the program for the lead unit or the program for the trail units. Line 90 also connects with a lead line 90a which in turn connects with the lead line 74a and 84a (see FIG. 6). In this manner, the latch circuits 74 and 84 are turned on only if there is a signal present on line 90 indicating that the locomotive is a lead unit, and only the lead unit provides a digital display of the set speed of the locomotive system on the LEDs 75 and 85.

Lines 26 and 28 are provided with resistors 92 and 93 and Schmidt trigger shaping circuits 94 and 95. The outputs from circuits 94 and 95 are applied to respective tri-state buffers 96 and 97 which are turned on when a signal is present on the 6B output line of decoder circuit 40 (FIG. 2). The output from buffer 96 is applied to the microprocessor on data bus line DB7, and the output from buffer 97 is applied to data bus line DB6.

The Q output line of microprocessor 10a (see FIG. 2) is applied to an inverter circuit 98 and as one input to an NAND gate 99, as shown in FIG. 3. The other input to NAND gate 99 is applied thereto on line 100 which is tied to line 90. The output of AND gate 99 is applied to an inverter 101 and through a resistor 102 to the base of a transistor Q9 forming part of a power amplifier and voltage regulator circuit or signalling circuit which also includes transistors Q7 and Q8. The output from inverter circuit 98 is applied to another inverter 103 and through a resistor 104 to the base of transistor Q9 to a node 105 which also connects with the line leading from resistor 102. The voltage applied to the base of transistor Q9 is a reference voltage which has one value when line 90 is a logic one level, as when the locomotive is a lead unit, and a different value when line 90 is a logic zero level, as when the locomotive is a trail unit.

A potential of +70 volts is applied to line 106 of the voltage regulator circuit. A capacitor 107 and a voltage spike suppressor 108 are tied in parallel between line 106 and common line 109 which leads through resistor 110 to the base of transistor Q8. Line 106 leads to the emitter electrode of transistor Q7 and connects with the base thereof through line 111, a resistor 112 and a conductor 113 which also connects with the collector of transistor Q9. Line 111 leads to the collector of transistor Q8. The emitter electrodes of transistors Q8 and Q9 are connected together through a resistor 114 to common. The base of transistor Q8 is connected through a resistor 115 with an output line 116 leading from the collector of transistor Q7.

When the base of transistor Q9 is turned on due to the presence of a pulse on the Q output line of the microprocessor, transistor Q9 is conductive and transistor Q7 is in turn switched to the conductive state such that a positive voltage is applied to line 116. Due to the negative feedback arrangement of the circuit and the voltage divider arrangement associated with the base of transistor Q8, the voltage applied to its base is forced to correspond to the voltage applied to the base of transistor Q9. The components of the circuit are selected such that when the Q output line for the lead unit goes high to set one reference voltage on the base of transistor Q9 (and also Q8), a 60 volt pulse is keyed onto line 116. The logic level on line 100 to NAND gate 99 determines the voltage at node 105 during a pulse on the Q output line. When the Q line for a trail unit goes high to set a lower reference voltage on the base of transistor Q9, line 116 receives a 30 volt pulse. The circuit thus keys 30 volts on line 116 for a trail unit and 60 volts for a lead unit under the timed control of the Q output line of microprocessor 10a.

The output line 116 of the signalling circuit leads through a diode 118 to a node 119 which is tied to the collector of a transfer switch transistor Q2. Lines 120 and 121 also connect from node 119 through diodes 122 and 123. Line 121 leads to a node 124 to common through load resistor 126. Line 120 leads to node 126 and to common through load resistor 128. The "No. 18" train line wire has its incoming portion 13a connected with node 124 and its other portion 13b connected with node 127. A diode 129 is connected between node 126 and another node 130, while another diode 131 is connected between nodes 124 and 130. Extending to connection with node 130 is a conductor 132 which is tied to the emitter of transistor Q2.

Transistor Q2 is turned on and off under the control of microprocessor 10a. Referring briefly to FIG. 2, numeral 134 designates a 4076 latch circuit having a conductor 135 connected with its Q4 output pin. With reference again to FIG. 3, conductor 135 connects with the base of a transistor Q1 through an inverter 136 and a resistor 137. The base of transistor Q1 is connected to common through a resistor 138. The emitter of transistor Q1 is common, while its collector is connected through a resistor 139 to the base of transistor Q2. A resistor 140 is tied between the base and the emitter electrode of transistor Q2.

Extending from node 130 of the diode bridge circuit is a conductor line 142 which connects through resistor 143 with the positive input side of a 3290 receiver comparitor circuit 144. A conductor 145 having a resistor 146 connects with line 88 and with the negative input side of comparitor 144 through a connecting line 147. A positive potential of five volts is applied to line 147 through a resistor 148. Line 145 leads through a resistor 149 to a node 150 which is common and which is tied to line 153 through a resistor 151. A capacitor 152 is included in the circuit in a line 153 extending from line 142 to node 150. A diode 154 is tied between line 153 and +5 volts.

Comparitor 144 provides an output on line 156 which connects with the EF4 input flag 21 of microprocessor 10 (See FIG. 2). Also tied to line 156 is a conductor 157 which is connected with +5 volts through a resistor 158. Another resistor 159 is tied between lines 142 and 157.

The threshold voltage at which comparitor 144 provides an output on line 156 to the EF4 flag of the microprocessor is set by the voltage on line 145, which varies depending upon whether the locomotive is a lead unit or a trail unit. The components are chosen such that an output will appear on line 156 if there is a lead unit input on line 145 and a voltage greater than about 20 volts appears on line 142. Accordingly, the lead unit will respond to all 30 volt signals corresponding to signals from any of the trail units. An output will appear on the output line 156 of the trail units if a trail unit input is present on line 145 only when the signal on line 142 is greater than about 45 volts. The trail units will thus respond to 60 volt signals from the lead unit but not to 30 volt signals from trail units. The condition of line 145, which depends upon the status of the locomotive as a lead or trail unit, is used as the reference input to comparitor 144 to control the response of the comparitor upon its receipt of the various signals which are transmitted along the "No. 18" train line wire 13.

Figure 8:
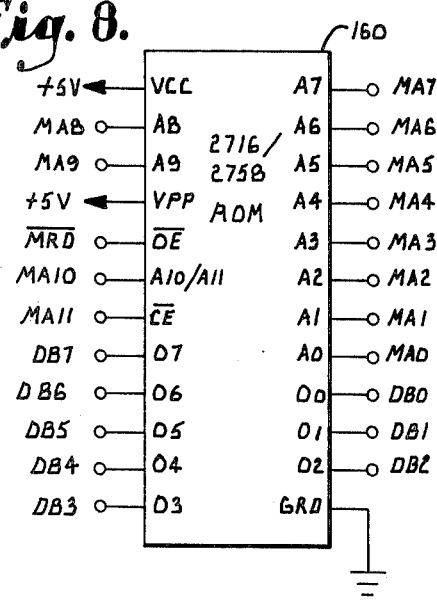
FIG. 8 is a schematic diagram of the read only memory associated with the microprocessor.
Figure 9:
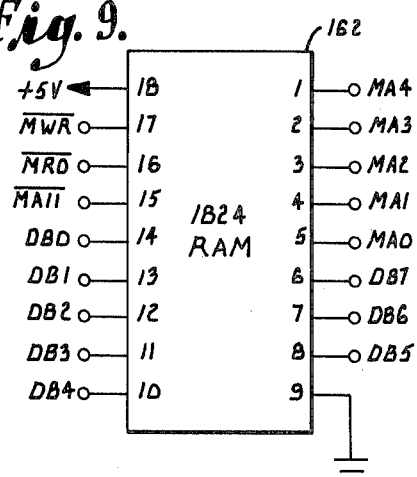
FIG. 9 is a schematic diagram of the random access memory associated with the microprocessor.
Figure 10:
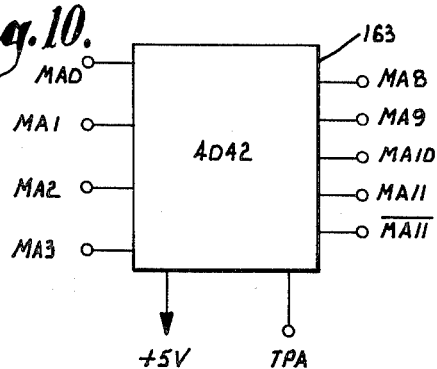
FIG. 10 is a schematic diagram of the memory address latch circuit associated with the microprocessor.
Figure 11:
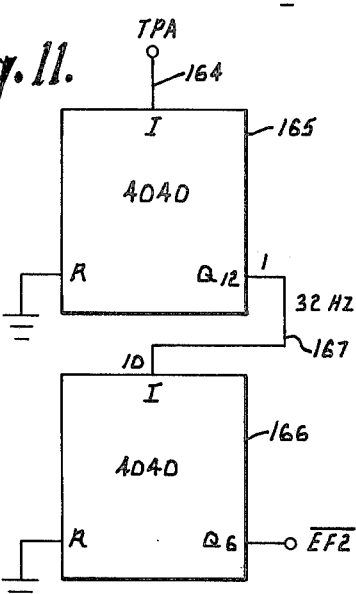
FIG. 11 is a schematic diagram of a timing circuit associated with the microprocessor.

FIG. 8 illustrates a read only or program memory which is generally designated by reference numeral 160. A random access memory 162 is shown in FIG. 9. The various input and output lines of the ROM 160 and RAM 162 connect with the corresponding lines of the microprocessor 10 and the other circuit components. Also included in a memory address latch circuit 163 (FIG. 10) having memory address lines which connect with the corresponding memory address lines of the microprocessor in a conventional manner. FIG. 11 depicts a timing circuit having a TPA line 164 connecting with a 4040 integrated circuit 165. Extending from the Q terminal of circuit 165 to the I terminal of another 4040 integrated circuit 166 is a conductor 167. The timing circuit is a frequency divider operates from the crystal controlled oscillator associated with microprocessor 10a to provide a 2-second time mark to the microprocessor 10a. The EF2 line of circuit 166 connects with the EF2 flag of the microprocessor.

Referring now to FIG. 2, the microprocessor 10 is accurately timed by a quartz crystal 168 which is tied in parallel with a resistor 169. The commands for input and output information are controlled by the decoder latch circuit 40 and by another decoder latch circuit 170. The No output of the microprocessor is connected with the A0 pin of each circuit 40 and 170, while the N1 output connects with the A1 pins of the decoder circuits. The memory read output MRD of the microprocessor connects through an inverter 171 with a conductor 172 leading to the E pin of circuit 40. The MRD output also connects with one input pin of a NAND gate 173 which receives its other input on the TPB line 174. The output line 175 of AND gate 173 leads to the E pin of decoder circuit 170.

Output line 69 of decoder circuit 40 serves to turn on the tri-state buffer circuits 36c–39c and 41c–42c (see FIG. 4) associated with the throttle lines 36–39 and the dynamic brake line 42 and the override pushbutton 41 when the microprocessor calls for information as to the condition of these lines. Output line 6A of circuit 40 similarly turns on buffer circuits 66b–69b and 76b–79b (FIG. 6) when the microprocessor calls for information concerning the speed set switches 66a–69a and 76a–79a. In the same fashion, the 6B output line of circuit 40 turns on inverter circuits 62c–65c (FIG. 5) when the microprocessor calls for information as to the condition of dip switches 62–65. Decoder circuit 170 has a 61 output line and a 62 output line having an inverter 176. Another output line 177 of circuit 170 connects with the 63 output line through an inverter 177a. Signals on the 61, 62 and 63 lines of decoder circuit 170 are activated by the microprocessor to output various types of information, as will be more fully explained.

If the voltage on the memory read line MRD is high, a low voltage from inverter 171 is directed via line 172 enabling circuit 40. If, at the same time as the MRD line is a high, the N0 and N1 lines of the microprocessor, or both, are high, an output from circuit 40 appears on line 69, line 6A or line 6B, depending upon the conditions of the N0 or N1 lines. The output lines 69, 6A and 6B command input information as to the condition of the throttle lines, the dynamic brake line, the condition of the override pushbutton, the condition of the speed set switches, or the condition of switches 62–65. Conversely, if the MRD line is low and the TPB line is high, an enabling output appears on line 175, and, if either the N0 or N1 output, or both, are also high, circuit 170 provides an output on the 61 line, the 62 line or the 63 line to command output information.

With continued reference to FIG. 2, the clock input pin C of latch circuit 134 is connected with line 177 by a conductor 178. In addition to the Q4 output provided on line 135, circuit 134 has Q2 and Q3 outputs which are applied to lines 179 and 180, respectively. Lines 179 and 180 have respective inverters 181 and 182 and power inverters 183 and 184. The output line of inverter 183 leads through a resistor 185 to the base of a transistor Q6 which is connected to common through another resistor 186. The emitter of transistor Q6 is common, while its collector is connected with +70 volts through a resistor 189 and another resistor 190. The voltage is also applied to the emitter of a transistor Q5 having its base connected with a node 191 disposed between resistors 189 and 190. The collector of transistor Q5 is connected through a diode 192 with the output line 32 which leads to the engine run dropout relay coil 33 (See FIG. 1). A diode 193 acts to prevent voltage spikes.

The output line of inverter 184 has a resistor 194 and is connected with the base of a transistor Q4 which is connected to common through another resistor 195. The emitter electrode of transistor Q4 is also common, while its collector receives +70 volts through a pair of resistors 196 and 197. The base of another transistor Q3 is connected with a node 198 located between resistors 196 and 197. The emitter of transistor Q3 receives +70 volts, while its collector connects through diode 199 with the line 30 having the power reduction relay coil 31. Diode 200 serves to prevent voltage spikes.

With continued reference to FIG. 2, the latch circuit 134 is reset under the control of a 4013 latch (watchdog) circuit 202 which functions in the manner of a one shot circuit. The S terminal of circuit 202 is common, while its C terminal is connected with the N2 line (pin 17) of microprocessor 10. The data input pin D is connected to +5 volts. The Q output line 204 of circuit 202 has a diode 205 and leads to a node 206 which is connected to common through a capacitor 207. Node 206 connects through resistor 206a with another node 208 which feeds through a resistor 209 to common. Node 208 is connected with pin 15 of latch circuit 134 by line 210.

The R input line 212 is connected to common through a capacitor 213 and to +5 volts through resistor 215. A diode 216 is tied between lines 204 and 212. A positive potential of +5 volts is applied to a line 217 having a diode 218 and leading to a node 219 which is connected with node 206. A Schmidt trigger inverter circuit 220 is tied between node 219 and another node 221 which is connected to node 208. A Schmidt trigger shaping circuit 222 is connected between node 221 and the clear line CLR of the microprocessor.

The 4013 latch (watchdog) circuit 202 prevents the microprocessor 10a from operating improperly in the event of a momentary power lapse or transient. When commands to provide output are being applied to output N2, N2 triggers circuit 202 to provide a high output pulse on line 204. Capacitor 207 is then charged and a high output will appear on clear line CLR. Thus, if pulses continue, capacitor 207 remains charged and the clear line remains high. However, if there is a power lapse, or the associated program fails to execute the output function, the Q line 204 of watchdog circuit 202 stays low, capacitor 207 discharges, and the clear line CLR goes low and resets microprocessor 10a. Capacitor 207 then recharges through R 206a and the microprocessor resumes operation in the proper manner.

Figure 13:
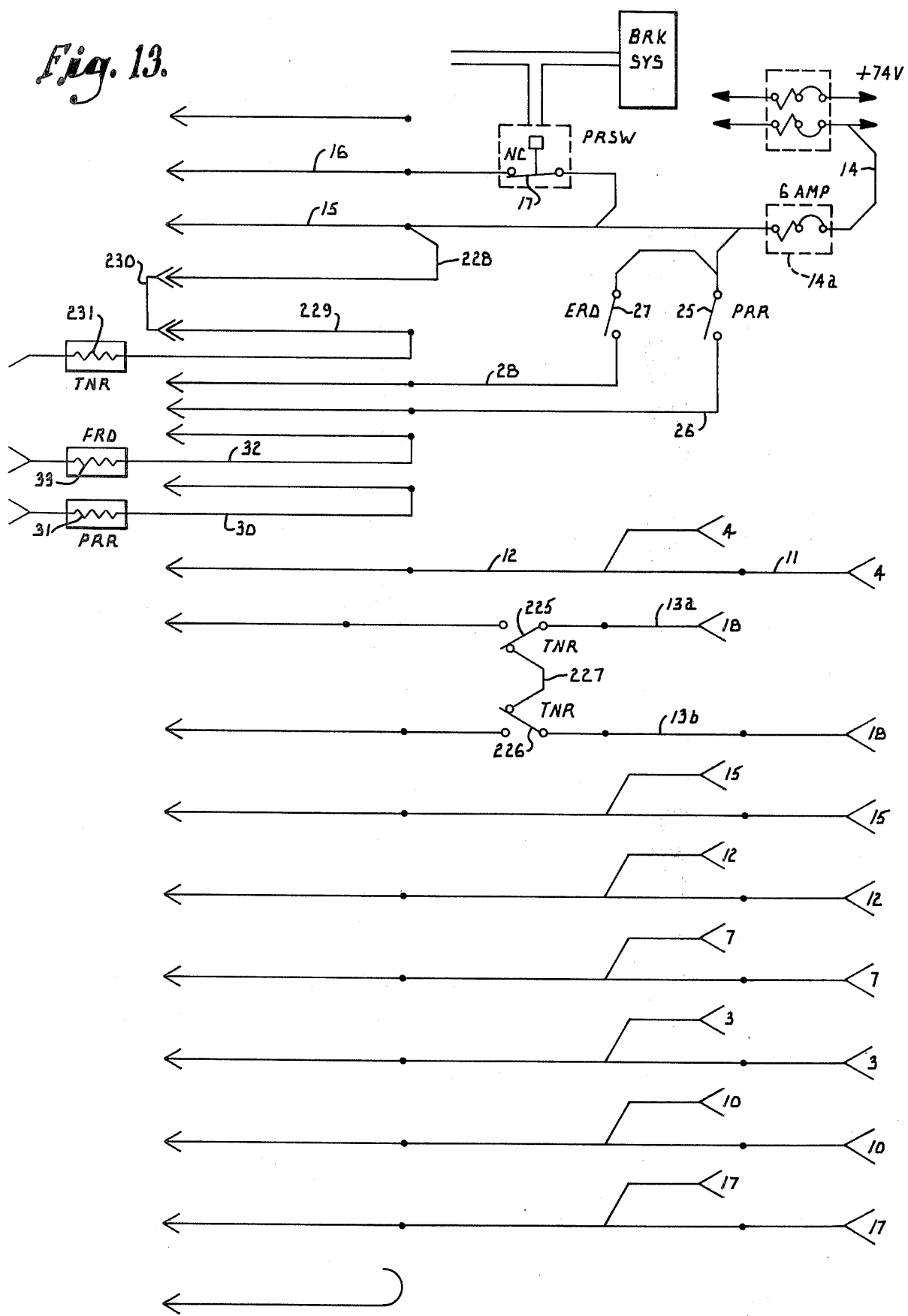
FIG. 13 is a schematic wiring diagram showing the various train line wires and the relays which are included in the control circuitry of each locomotive in accordance with the invention.

Referring now to FIG. 13, the common "No. 4" train line wire 11 connects with the connecting line 12 which may be plugged or otherwise connected with the microprocessor system. Train line wire 11 connects with the microprocessor system of the lead unit and all of the trail units in this manner. The "No. 18" train line wire 13 is used to transmit control and acknowledgement signals between the locomotive units, and the first portion 13a connects with microprocessor system 10 through a relay contact 225 forming part of a train line relay. Portion 13b of the train line wire 13 is likewise connected with the microprocessor through a relay contact 226. When contacts 225 and 226 are in their normal positions as shown in FIG. 13, they contact a shunt line 227 which connects portions 13a and 13b such that train line wire 13 bypasses microprocessor system 10 in that locomotive. The remaining train line wires interconnect the locomotives in the usual manner.

Line 15 connects with a conductor 228 which is connected with another line 229 by a jumper line 230 located within the control box (not shown) which contains microprocessor 10 and the various other components of the control device. Line 229 connects to relay coil 231 of the train line relay. When coil 231 is energized, contacts 225 and 226 are moved away from shunt line 227 to connect portions 13a and 13b of train line wire 13 with the microprocessor. Accordingly, whenever power is applied to the microprocessor system, coil 231 is energized and train line wire 13 is connected with the microprocessor systems such that control and acknowledgement signals can be transmitted along it. However, if one of the locomotives is not equipped with a control device or if the device should malfunction, lines 228 and 229 will be disconnected and coil 231 will not be energized. In this situation, train line wire 13 bypasses the control device in that locomotive since portions 13a and 13b are connected by shunt line 227 through the relay contacts 225 and 226.

Figure 14:
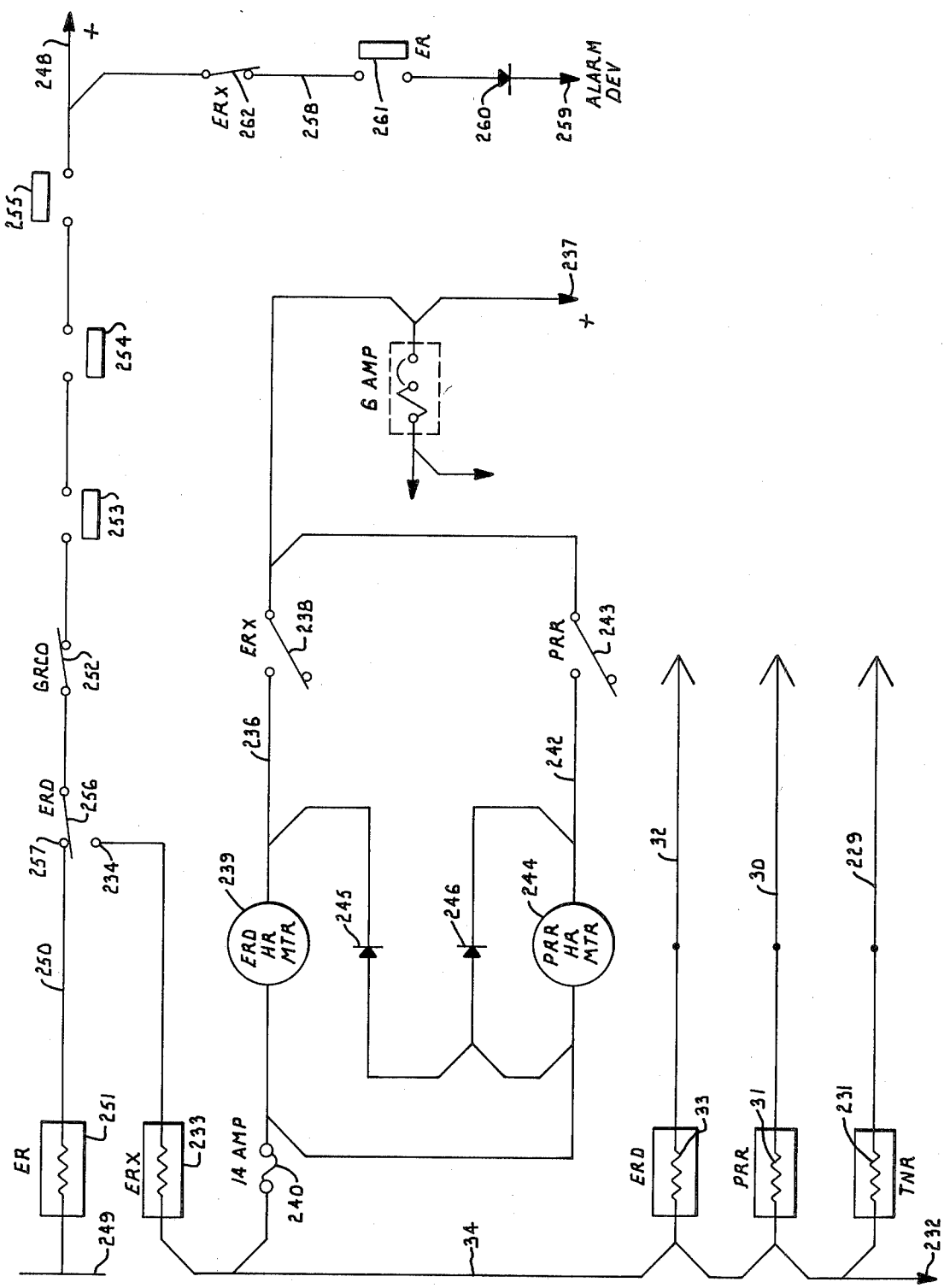
FIG. 14 is a schematic wiring diagram showing the various relays which are included in the locomotive control circuitry and their manner of connection with the control device.

Referring now to FIG. 14, the line 34 provides a common return path for relay coils 33, 32 and 231 and is connected with a negative terminal 232 at one end.

Included in a circuit to line 34 is a conductor 236 which has a positive feed 237 at its opposite end. Line 236 is broken by a switch contact 238 which is controlled by coil 233, controlling an hour meter 239 for metering the time during which the engine run dropout relay is in operation. A fuse 240 is also inserted in line 236.

Line 242 includes a relay contact 243 which closes when the power reduction relay coil 31 is energized. An hour meter 244 is also included in line 242 to meter the time of operation of the power reduction relay. Transient protection diodes 245 and 246 are provided in circuits arranged in parallel with hour meters 239 and 244.

Extending between a positive feed 248 and a negative terminal 249 is a conductor 250 having a relay coil 251. Coil 251 is the coil of the engine run relay included in the conventional control circuitry of diesel locomotives. The manner of operation of the engine run relay is well known, as is the manner in which it controls various sections of the throttle control circuitry so as to govern operation of the speed setting solenoids. When energized, coil 251 positions its relay contact (not shown) such that the throttle control circuitry of the locomotive responds to the throttle position of the locomotive, thereby allowing the locomotive to operate normally. Conversely, when coil 251 is deenergized, its relay contact is positioned to prevent the locomotive from operating above idle speed. More specifically, the relay contact of coil 251 is connected in series with the control governor solenoids which regulate the speed of the engine. Thus, when coil 251 is energized to maintain the contact closed, the circuit to the governor solenoids is closed, and when coil 251 is deenergized to maintain the contact open, the governor solenoids are removed from the control system and the normal throttle control circuitry is overridden to automatically place the locomotive in a throttle one power condition. The throttle one condition is essentially the same as idle speed except that the locomotive remains loaded in order to protect the traction motors.

Also included in line 250 are relay contacts 252–255 which open under the control of various alarm devices if an alarm condition occurs. Contacts 252–255 are conventional components of the throttle control circuitry of locomotives and are not a part of the present invention. A relay contact 256 controlled by the engine run dropout coil 33 is maintained against a stationary contact 257 of line 250 when coil 33 is deenergized. Upon energization of coil 33, contact 256 closes stationary contact 234. The engine run relay coil 251 is thus normally energized but is deenergized when coil 33 is energized.

The positive feed 248 is normally provided to an alarm device (not shown) connected with line 258 via an output 259. Line 258 includes a diode 260 and a relay contact 261 which closes to sound an alarm device when the engine run relay coil 251 is deenergized in normal operation. In accordance with the present invention, another relay contact 262 controlled by the engine run extra coil 233 is provided in line 258. Contact 262 is normally closed to permit the alarm to be sounded when contact 261 closed due to deenergization of coil 251 in normal operation of the locomotive. However, if coil 251 is deenergized due to movement of contact 256 caused by a signal applied to coil 33, coil 233 is energized to open contact 262 such that line 258 is an open circuit which does not cause the alarm to be sounded.

Figure 15:
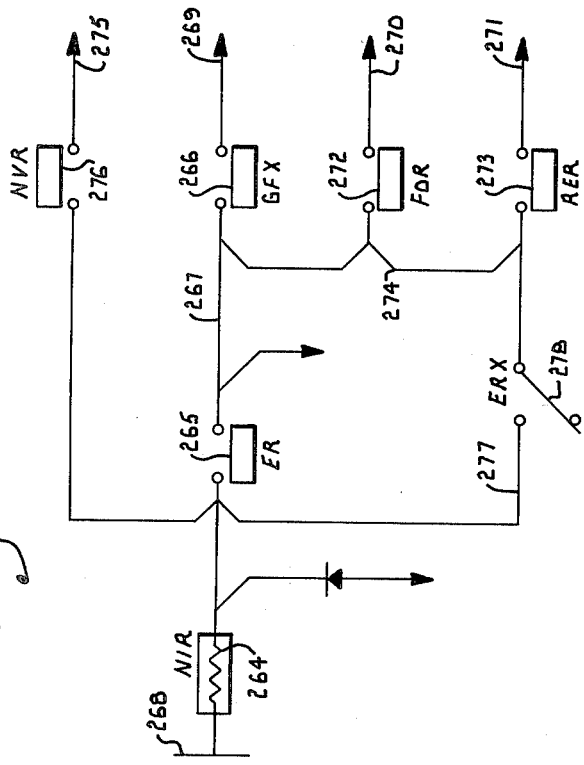
FIG. 15 is a schematic wiring diagram of selected relay contacts and switches included in the locomotive control circuitry.

FIG. 15 illustrates an addition to the throttle control circuitry which prevents the normal idle relay coil 264 from being deenergized when the contact 265 of the engine run relay is opened due to deenergization of the engine run relay coil 251 in the fuel save mode of operation. The contact 265 and the normal idle relay coil 264 are arranged in series with one another and with a switch 266 in a conductor 267 extending between negative terminal 268 and a positive feed 269. Additional positive feeds 270 and 271 are connected with line 267 through switches 272 and 273 and line 274. Still another positive feed 275 connects with line 267 through switch 276. It is thus apparent that upon deenergization of coil 251 and consequent opening of its relay contact 265, coil 264 is normally deenergized. To prevent this when the deenergization of coil 264 is caused by operation of the locomotive in the fuel save mode, a line 277 is connected in a manner to by pass the engine run relay contact 265. Line 277 includes a relay contact 278 which is normally open but which closes when the engine run extra coil 233 (FIG. 14) is energized. Thus, in the fuel save mode of operation, deenergization of engine run coil 251 to open its contact 265 is accompanied by energization of coil 233 closing contact 278, thereby maintaining the normal idle coil 264 in the energized condition.

Figure 16:
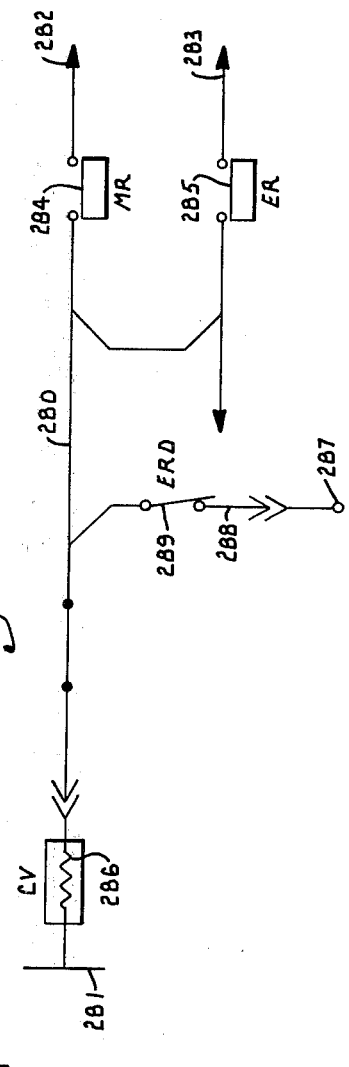
FIG. 16 is a schematic wiring diagram of selected switches and relay contacts included in the locomotive control circuitry.

To keep the locomotive from stalling or bogging down in the fuel save mode of operation, the throttle control circuitry is modified in the manner shown in FIG. 16. The circuitry shown in FIG. 16 is for the most part conventional and is used to measure the throttle response of the locomotive. A conductor 280 connects with a negative terminal 281 through relay coil 286 at one end and has connections to terminals 282 and 283 at its opposite end which are electrically coupled with other components of the throttle control circuitry to provide thereto an indication of the throttle response measured by the circuit. Relay contacts 284 and 285 are closed when the locomotive system is in motion, and the relay coil 286 in line 280 is thus energized. A load characteristic 287 is connected with line 280 via a conductor 288. In accordance with the present invention, line 280 is provided with a relay contact 289 which is normally closed but which opens when the engine run dropout coil 33 is energized to place the locomotive in the full fuel save mode of operation. The load characteristic 287 is then removed from the circuit due to opening of contact 289 in the fuel save mode.

Figure 17:
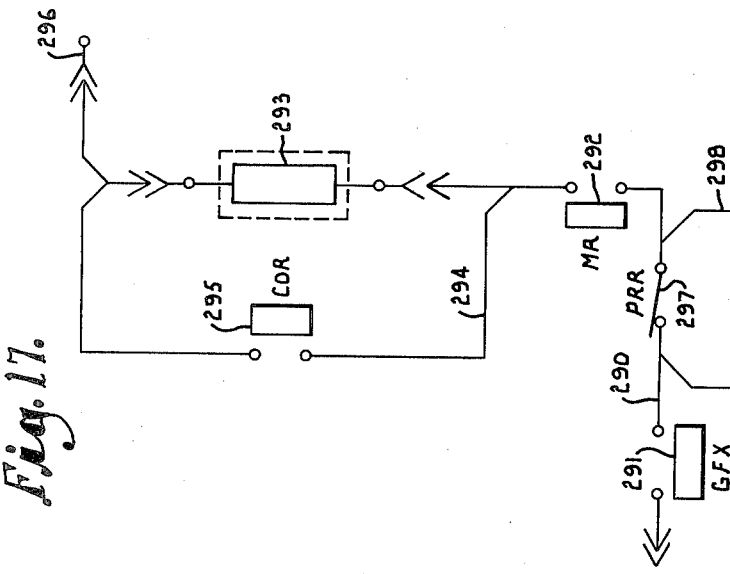
FIG. 17 is a schematic wiring diagram of still other components included in the locomotive control circuitry.

The circuit shown in FIG. 17 maintains the locomotive at one half its maximum power when the power reduction relay coil 31 is energized. The main generator of the locomotive (not shown) is excited to provide output power of the locomotive by applying voltage to a line 290 leading to the excitation of the main generator. Line 290 has relay contacts 291 and 292 and a resistor 293 which are not part of the present invention. A conductor 294 having a relay contact 295 bypasses resistor 293, both connected with a lead line 296 which receives current for excitation of the main generator. This circuit is conventional and is included in the control circuitry of standard locomotives. In accordance with the present invention, the conventional circuit is modified by adding to line 290 a relay contact 297 which is a normally closed contact but which opens when the power reduction relay coil 31 (see FIG. 1) is energized. An 800 ohm resistor 299 is included in line 298 and is thus in parallel with contact 297.

Energization of coil 31, as effected by microprocessor system 10, causes contact 297 to open, thus adding the 800 ohm resistor 299 to the circuit which leads to the excitation of the main generator of the locomotive. Addition of resistance to the circuit decreases the excitation of the generator, and the resistance is chosen such that the output horsepower provided by the generator is cut in half when resistor 299 is added to the circuit. In this fashion, the locomotive is automatically placed in a one half power condition when the microprocessor provides a one half power (fuel save one) signal energizing the power reduction relay coil 31.

Figure 7:
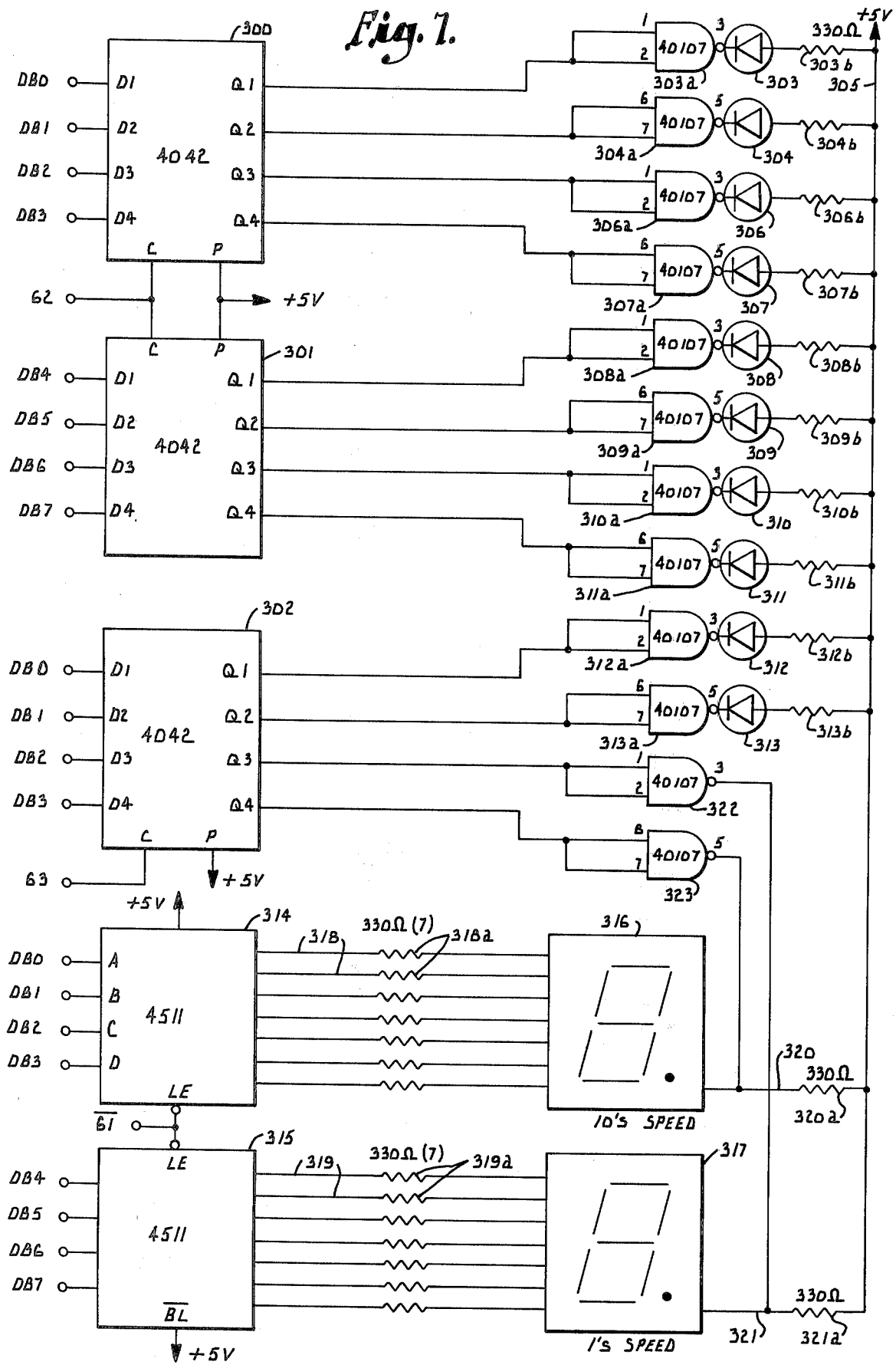
FIG. 7 is a schematic diagram of the circuits which display the actual speed of the locomotive consist and the fuel save condition of all locomotives in the consist.

FIG. 7 illustrates output circuits of the microprocessor system which provide a visual display of the actual speed of the locomotive system and the fuel save condition of each locomotive in the system. Three 4042 latch circuits 300, 301 and 302 are connected with the designated data bus lines of the microprocessor 10a. The 62 output line from the decoder latch circuit 170 (see FIG. 2) drives the clock inputs C of latches 300 and 301, while the clock input C of latch 302 is driven by the 63 output line of circuit 170. The P input of each latch is connected with +5 volts.

The $Q_1$ and $Q_2$ output pins of latch 300 connect with LEDs 303 and 304 through respective 40107 driver circuits 303a and 304a. The LEDs 303 and 304 correspond to the first trail locomotive unit and connect through respective resistors 303b and 304b with a conductor 305 which receives +5 volts. LED 303 displays a color such as red, while the other LED displays a contrasting color such as green. Another pair of LEDS 306 and 307 are connected with pins $Q_3$ and $Q_4$ of latch 300 through drivers 306a and 307a and with line 305 through resistors 306b and 307b. LEDs 306 and 307 correspond to the second trail unit. Again. LED 306 displays a red color while LED 307 displays a green color.

Latch 301 applies its $Q_1$ and $Q_2$ outputs to another pair of LEDs 308 and 309 through drivers 308a and 309a. LEDs 308 and 309 correspond to the third trail unit and display red and green colors, respectively. Resistors 308b and 309b are tied between the respective LEDs 308 and 309 and line 305. In a similar manner, a pair of LEDs 310 and 311 corresponding to the fourth trail unit are connected with the $Q_3$ and $Q_4$ outputs of latch 301 through respective drivers 310a and 311a. Resistors 310b and 311b are tied between line 305 and the respective LEDs 310 and 311. Like the other pairs of LEDs, the LED 310 displays red and LED 311 displays green.

A final pair of LEDs 312 and 313 correspond to the lead unit. The LEDs 312 and 313 are connected with the $Q_1$ and $Q_2$ outputs of latch 302 through respective driver circuits 312a and 313a and with line 305 through respective resistors 312b and 313b. LED 312 displays the color red when lit, while LED 313 displays green. Additional pairs of LEDs can be provided if there are more than four trail units.

A pair of 4511 decoder latch circuits 314 and 315 connect with the designated data bus lines of the microprocessor and are controlled by the 61 output line of circuit 170 (FIG. 2) which connects with the LE lines of circuits 314 and 315. Each circuit 314 and 315 is connected with +5 volts and functions to decode the information as to the actual speed of the locomotive system, which is provided to the microprocessor by the circuit shown in FIG. 5a. The actual speed information is transmitted by circuits 314 and 315 to respective LEDs 316 and 317 over a series of conductors 318 and 319 having resistors 318a and 319a therein. The actual speed information is applied in coded form to LEDs 316 and 317 which display the actual speed of the locomotive system in digital form. LED 316 represents the ten's place of the actual speed, while LED 317 displays the one's place of the speed. Preferably, LEDs 316 and 317 are located side by side to provide a convenient digital display of the actual speed of the locomotive system.

A conductor 320 extends from LED 316 to connection with line 305. Line 320 includes a resistor 320a. Another line 321 having a resistor 321a extends between LED 317 and line 305. The $Q_3$ output of latch 302 is connected with line 321 through a driver circuit 322, while the $Q_4$ output of circuit 302 is similarly connected with line 320 through a driver circuit 323. The digital outputs of driver circuits 322 and 323 thus turn on or off the decimal points on the numeric LED displays 317 and 316, respectively.

Operation

In operation, the control device controls the locomotive system such that it travels at a set speed with minimum fuel consumption. Setting of the desired set speed is accomplished by appropriately positioning switches 66a–69a and 76a–79a (FIG. 6) of the lead locomotive, and the set speed is visually displayed on LEDS 75 and 85 and is provided as input information to microprocessor 10 on the data bus lines DB0–DB7. Under program control, the microprocessor 10 then maintains the locomotive at or near the set speed by selectively placing one or more of the locomotive units at the one half power setting (fuel save one condition) or at the No. 1 throttle position which is essentially the same as idle speed (fuel save two condition). As will be described in connection with the software, the acceleration and deceleration of the consist are taken into account in determining the power settings of the locomotives units.

The control function of the device is performed by the microprocessor 10 which applies pulses to its Q output line (pin 4). The signals on the Q line of the lead locomotive cause 60 volt pulses to be applied to the output line 116 of the signalling circuit (see FIG. 3) in the manner indicated previously. These signals pass through diode 118 and also through diodes 122 and 123 to both portions 13a and 13b of the "No. 18" train line wire 13. The control signals from the lead unit are thus transmitted in both directions along train line wire 13 so that the physical position of the lead unit in the locomotive consist may be either at the front or the rear. In this manner, the control function of the device will function as well during backing operations as during normal forward operation.

The first pulse which is emitted by the lead unit along train line wire 13 initially encounters the first trail unit which is immediately behind the lead unit. The 60 volt signal passes into the control device of the first trail unit along one of the train line wire portions 13a or 13b and through diode 131 or 129 to node 130. It is pointed out that the signal can be received in either direction on train line wire 13, so the physical location of the trail units in the consist is of no consequence.

From node 130, the incoming 60 volt signal is applied along line 142 to the positive input side of the receiver comparator 144 of the first trail unit. Transistor Q2 is nonconductive at this time, so it blocks the signal and prevents it from passing through diodes 122 and 123 and back out along lines 13a and 13b to the other trail units. Since the locomotive is a trail unit, as sensed by the condition of line 145 which connects to the negative input side of comparator 144, an output signal appears on line 156 of the comparator and is applied to the EF4 flag of the microprocessor. Under program control, the microprocessor of the trail unit responds to the signal by providing a pulse on its Q output line, resulting in a 30 volt signal on the signalling circuit output line 116. This signal is applied through diode 118 and then through diodes 123 and 122 to both portions 13a and 13b of train line wire 13.

The 30 volt signal thus transmitted by the first trail unit is an acknowledgement signal which is delivered to the lead unit. The signal may be transmitted along either line 13a or 13b of the lead unit and through diode 131 or 129 to node 130 of the lead unit. The 30 volt signal is thus applied to the positive input side of the comparator 144 and generates an output on line 156 since there is a reference signal on line 145 corresponding to the status of the locomotive as a lead unit. The acknowledgement signal is applied to the microprocessor of the lead unit on flag EF4 to inform the microprocessor of the presence of the trail unit which transmitted the signal. As previously noted, the application of the 30 volt acknowledgement signal to the comparator 144 of any of the trail units will not provide an output signal from the comparator of these trail units due to the condition of the input line 145 of each trail unit.

The acknowledgement signal of each trail unit is used by the lead unit to determine the number of units available for control.

After the microprocessor of the lead unit receives the acknowledgement signal, it may or may not provide to the first trail unit a command to go into the half power condition, depending upon whether or not the locomotive consist can attain the set speed with the first trail unit at half power, and also depending upon the acceleration of the consist, as will be more fully explained. It should be pointed out that the trailing units which are furthest to the rear are preferably reduced in power before those toward the front, so the first trail unit is reduced in power only after all of the other trail units are reduced, as will become clear. If full power is needed from the first trail unit, there is no fuel save signal given, and the locomotive consist continues to operate with the first trail unit at full power. However, if the set speed can be achieved with the first trail unit at half power, the microprocessor of the lead unit commands the first trail unit to go into the half power or fuel save one condition.

If the fuel save one command is called for, it is given on the Q line of the microprocessor of the lead unit, and a 60 volt signal is applied to line 116 of the signalling circuit as a result. The signal is transmitted through diode 118 and through diodes 123 and 122 to the trail line wire portions 13a and 13b. The signal is received by the first trail unit and is directed through diode 129 or 131 to node 130 and then to positive input of the comparitor 144 to provide a signal on line 156 to the EF4 flag of the microprocessor. Under program control, the microprocessor of the trail unit provides an output signal on the $O_3$ line 180 of latch circuit 134 (FIG. 2) under the control of the clock input on line 178 which comes from the decoder latch 170. The signal on line 180 is applied to the base of transistor $Q_4$ to make it conductive, thus making transistor $Q_3$ conductive. A signal is then applied through diode 199 to line 30, and the power reduction relay coil 31 is energized. As explained previously, this opens the relay contact 297 shown in FIG. 17 to add the 800 ohm resistor 299 to the circuit leading to the main generator excitation. Excitation of the generator is reduced such that the first trail unit operates at half its maximum power.

Referring to FIGS. 1 and 3, energization of relay coil 31 also closes contact 25 to complete the circuit through line 26 to the microprocessor when the 6B line of circuit 40 is high to turn buffer 96 on. Information as to the fuel save one or half power condition of the first trail unit is then transmitted to the microprocessor data bus line DB7.

If the first trail unit has gone to half power, it transmits this information to the lead unit by providing a pulse on the Q line of the microprocessor. The Q line pulse effects a 30 volt acknowledgement signal on line 116 which is transmitted in both directions on train line wires 13a and 13b. The incoming 30 volt signal is applied to the positive side of comparator 44 in both lead and adjacent trail units and an output on line 156 is applied to the EF4 flag of the microprocessor to indicate to the lead unit that the first trail unit has gone into the half power fuel save one condition. Note that the adjacent trail unit does not detect the 30 volt signal because the threshold of the trail unit's comparator 44 is set at 45 volts as previously explained.

If half power operation of the first trail unit is needed to maintain the set speed, there is no full fuel save signal given, and the locomotive consist operates with the first trail unit at half power. However, if the set speed can be attained without power from the first trail unit, a full fuel save signal is provided by the lead unit on the Q line of its microprocessor. This results in a 60 volt signal on line 116 which is transmitted on train line wire 13 to the first trail unit. Under program control, the microprocessor of the first trail unit then applies an output signal on the $Q_2$ output line 179 of latch circuit 134 (see FIG. 2). This signal turns on transistor Q6 which results in transistor Q5 being turned on to apply power through diode 192 to line 32 and the engine run dropout relay coil 33 included therein.

Energization of coil 33 (FIG. 14) deenergizes the engine run relay coil 251, thereby placing the first trail unit in the No. 1 throttle position. At the same time, coil 233 is energized to close contact 238 such that hour meter 239 is turned on. Contact 262 is opened to prevent sounding of the alarm device associated with output 259.

When the trail unit goes into the full fuel save mode of operation at the No. 1 throttle condition, coil 33 is energized to close relay contact 27, thus completing the circuit extending along line 26 to the microprocessor. This gives the microprocessor in the first trail unit information indicating that the unit is operating in the full fuel save mode. Under program control, the microprocessor of the trail unit applies a signal to its Q line if contact 27 is closed. This results in application of a 30 volt acknowledgement signal on the output line 116 of its trail signalling circuit, and the acknowledgement signal is transmitted on train line wire 13 to the lead unit and to its comparator 144. An output on line 156 of the comparator is applied to the EF4 flag of the lead unit microprocessor to acknowledge that the first trail unit is in the full fuel save mode of operation. This completes the series of pulses between the lead unit and the first trail unit, although the series is repeated during each cycle of operation of the control device.

The lead unit microprocessor then applies a pulse to its Q output line which provides an interrogation signal to the next trail unit which is the second trail unit from the lead locomotive. The signal initially reaches the first trail unit from either train line input 13a or 13b and passes through diode 131 or 129 to node 130. However, transfer switch transistor Q2 of the first trail unit is normally not conductive, so the signal which is applied to its emitter will not be conducted to diodes 122 and 123, thus breaking the signal path between the lead unit and succeeding trail units.

Turning on of transistor Q2 of the first trail unit is achieved under trail program control after elapse of the time period during which the unit can be directed to go into the full fuel save mode of operation. A signal is then provided on the Q4 output line 135 of latch circuit 134 under control of the clock input line 179 which is actuated by the decoder latch circuit 170 (see FIG. 2). The signal on line 135 is applied through amplifier 136 and resistor 137 to the base of transistor Q1, as shown in FIG. 3. Transistor Q1 is then conductive to provide a signal to the base of transistor Q2, making the latter transistor conductive such that incoming signals thereafter are transferred in both directions through the circuitry of the first trail unit.

The signal which is transferred through the first trail unit is applied to the second trail unit, and to its receiver comparitor 144 which provides a signal on output line 156 to the EF4 flag of its microprocessor. This interrogation signal is acknowledged by the second unit in the same manner indicated in connection with the first unit, and the lead unit is thus apprised of the presence of the second trail unit in the consist. The lead unit then applies command signals directing the second unit to go into either the half power or No. 1 fuel save condition, or into the full fuel save condition if no output power is needed from the second unit. These command signals and their acknowledgement signals are transmitted in the manner indicated previously in connection with the first trail unit.

After sufficient time has elapsed for the signals to the second trail unit to be given, its transistor Q2 is turned on in the manner indicated previously in connection with the first trail unit, and subsequent signals transfer through the first and second units and go to the third trail unit. Eventually transistor Q2 of the third unit is turned on, and the signals thereafter go from the lead unit to the fourth trail unit. As previously suggested, power reduction of the locomotives is preferably effected from back to front so that the last trail unit is reduced to half power and then to no power, the third trail unit is reduced to half power and then to no power, and so on until no more power reduction can occur without causing the consist to fall short of the set speed.

If all of the trail units are at the no power (No. 1 throttle) setting and the set speed can be attained with the lead unit at one half power, the microprocessor of the lead unit is programmed to provide a signal which, under control of latch circuits 170 and 134, is applied to the power reduction relay coil 31 included in line 30 of the lead unit. When coil 31 is energized, the lead unit goes to one half power in the same manner as the trail units. In the preferred form of the invention, the lead unit does not go to the full fuel save No. 1 throttle position under control of the control device, since the engineer may then have some control over power of the locomotive consist. However, it should be understood that the control device can be arranged to completely control the power of the consist in automatic fashion and without any control being left to the engineer.

Figure 12:
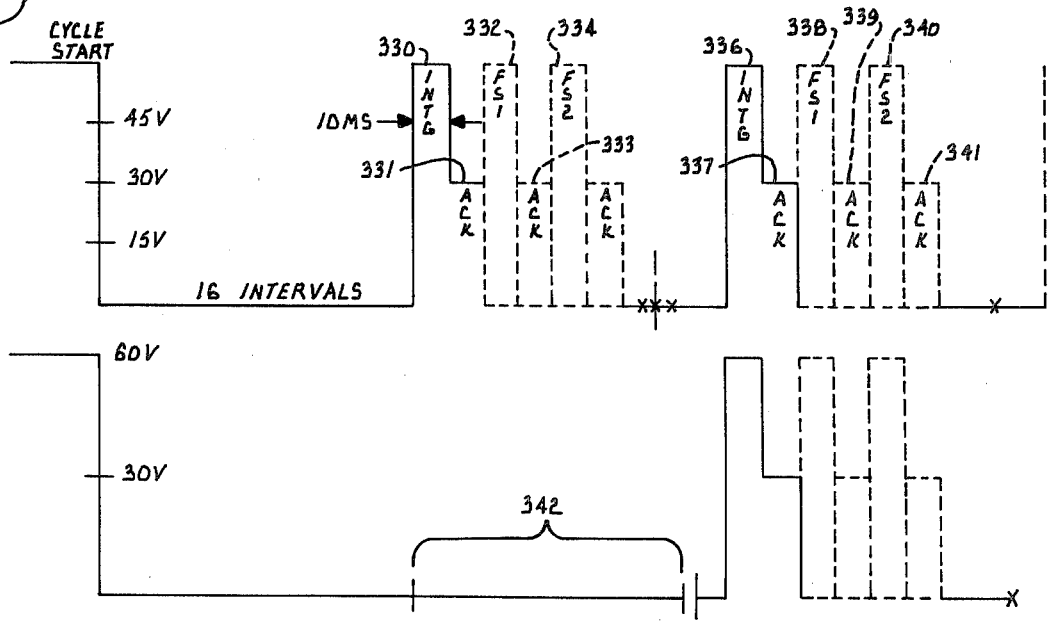
FIG. 12 is a diagrammatic illustration of the control pulses transmitted by the lead unit and the acknowledgement pulses transmitted by the trail units.

FIG. 12 illustrates diagramically the pattern of the interrogation and control pulses provided by the lead unit and the acknowledgement pulses provided in reply by the trail units. For failsafe operation, the train line wire 13 normally has 60 volts applied to it so that in the event of a power failure, the train line wire voltages remaining low will take the consist out of the fuel save mode. The control device of the present invention drops the voltage on train line wire 13 to zero for a time duration equal to 16 time intervals of 5 milliseconds each, starting a command cycle in which a series of interrogation, acknowledgement and command pulses appear at accurately timed intervals. The above operation causes the corresponding transfer switches Q2 of all trail units to be opened, thereby causing the first interrogation by the lead unit to be detected only by the first trail unit. The initial pulse applied to train line wire 13 by the lead unit is a 60 volt pulse 330 having a duration of 10 milliseconds. It is applied to the first trail unit which responds during the next 10 millisecond time interval by transmitting to the lead unit a 30 volt acknowledgement signal 331. If reduction of the first trail unit to half power is to occur, a 60 volt fuel save one command pulse 332 is given by the lead unit, and the first trail unit responds by going to one half power and acknowledging that it has done so by providing to the lead unit a 30 volt acknowledgement signal 333. A 60 volt full fuel save signal 334 may follow and be acknowledged by a 30 volt pulse 335 from the first trail unit.

After the above precise time intervals have elapsed, the first trail unit closes its corresponding transfer switch, enabling the second trail unit to receive 60 volt pulses from the lead unit. The first trail unit will not (because of the associated program) respond to further lead unit pulses until the start of the next command cycle.

After elapse of the time period allocated for communicating with the first trail unit (60 milliseconds), the lead unit provides another 60 volt pulse 336 which is an interrogation pulse to the second trail unit. The second unit responds with a 30 volt acknowledgement pulse 337 indicating its presence in the consist. Then, a fuel save one signal 338 from the lead unit is possibly applied, followed by an acknowledgement signal 339 from the second trail unit, possibly a full fuel save signal 340 and an acknowledgement signal 341. The same pattern of pulses is then repeated for the third and fourth trail units and for additional trail units if there are more than four in the consist. The operation of the control device is accurately timed by the crystal controlled microprocessor oscillator and initiated in cooperation with the timing circuit shown in FIG. 11 at intervals of 2 seconds. The pulses transmitted on the Q line of each microprocessor are precisely controlled in synchronized fashion to correspond with the operation of the other microprocessors when signals are being transmitted between the locomotive units. The microprocessors thus transmit appropriate signals at the proper times and are in the "listening" or receiving mode at the proper times.

The lower diagram in FIG. 12 indicates that the second trail unit does not detect the first series of pulses which are shown collectively by bracket 342. The 60 volt pulses 330, 332 and 334 are effectively "swallowed" by the first trail unit, and the 30 volt acknowledgement pulses 331, 333 and 335 provided by the first trail unit are too small in amplitude to activate the receiver-comparitor 144 of the second trail unit. The first unit responds to only the first set of pulses indicated by the bracket 342 as programmed. Accordingly, each of the trail units receives only the appropriate series of pulses, and each trail unit responds with an acknowledgement signal that is detected only by the lower comparitor threshold of the lead unit. Other methods of signalling and sequencing the signals may be employed. For example, all pulses may be equal in amplitude and the pulses from the lead unit may all be sent out prior to the lead unit entering the receiving or listening mode. Discrimination between the control pulses and the acknowledgment pulses may be effected in any suitable manner. Media other than the train line wire can be used for transmission of the signals, such as radio for example.

When added power is called for to maintain the set speed of the consist, the lead unit is initially taken out of the half power setting and placed in the full power condition, followed by movement of the first trail unit from No. 1 throttle to half power and then to full power, movement of the second trail unit from No. 1 throttle to half power and then to full power, and so forth until there is sufficient overall power to maintain the set speed.

Summarizing the foregoing description of the operation of the control device, the set speed of the locomotive consist, as set by switches 66a–69a and 76a–79a in the lead locomotive, is maintained with each unit at either full power, half power or the no power No. 1 throttle position. Since the full power No. 8 throttle position is most efficient, the units are all in either the highly efficient full throttle position or at essentially idle speed in the No. 1 throttle position, except that one unit is sometimes operating at half power. Accordingly, the overall operating efficiency of the consist is increased and the fuel consumption is decreased in comparison to the conventional manner of operation wherein there is no variation of the throttle settings of the individual units in incremental steps but rather each locomotive unit is at the same throttle setting which is determined by the throttle setting of the lead unit. Providing each unit with a half power condition in the fuel save mode permits virtually any set speed to be accurately maintained under most circumstances, without significant disadvantages in fuel consumption since at the most only one unit is at half power at any one time. However, it is contemplated that any number of discrete power settings may be provided between the No. 1 and No. 8 throttle settings, and that it may in some situations be desirable to omit the half power setting and have each unit operate either at idle speed or full power.

Referring to FIG. 8, the actual speed of the locomotive consist is displayed on numeric LEDs 316 and 317. The operating mode of each locomotive is also visually displayed by the LEDs shown in FIG. 7. For example, when the fourth trail unit is operating at full power in the fuel save mode, the red LED 310 lights up under the influence of latch circuit 301 and driver circuit 310a to indicate that the fourth trail unit is operating at full power. If the fourth unit is at one half power, the green LED 311 is lit to indicate the half power condition. When the fourth unit is in the full fuel save condition, both of its LEDs 310 and 311 are out. The LEDs 303–309 for the remaining trail units of the consist and LEDs 312–313 for the lead unit are controlled in the same pattern to provide a visual indication of the operating condition of each locomotive. If desired, alternative lighting patterns can be employed to display the operating conditions of the locomotives. If the lead unit commands one of the trail units to go to one half power or no power and the trail unit fails to do so, relay contact 25 or 27 will fail to close as directed, and line 26 or 28 will remain open. Consequently, the trail unit will not transmit to the lead unit an acknowledgement signal. If this occurs for the first trail unit, for example, LEDs 303 and 304 are caused by the program to blink on and off to indicate a malfunction in connection with the first trail unit.

When the dynamic brake of the locomotive is applied, the signal on line 42 (FIG. 4) is provided to the microprocessor on data bus line DB7 when a signal is present on the 69 line connected with buffer 42c. When the dynamic brake is on, the control device automatically takes the locomotive consist out of the fuel save mode of operation, and the consist reverts to normal operation.

DESCRIPTION OF THE SOFTWARE

FIGS. 18–21 show the flow charts associated with the software of the microprocessors of the lead and trail units. Attached as an Appendix to the specification is the complete program. The flow charts will now be described in detail, beginning with the general flow chart depicted in FIG. 18.

When power is applied to the unit, the clear line CLR from the output of inverter gate 222 in FIG. 2 will be low due to the discharged state of capacitor 207. The 1802 microprocessor is designed to vector to a particular address in its program on the application of a low signal on its clear line. This is represented by address zero on the detailed program listing which is appended hereto and as shown as the symbol marked START at the top of FIG. 18. After the clear line is released, the processor begins to execute instructions from this location and executes the function shown in Block 500 which blanks the speed display, blanks any status indicators, zeros a parameter designated here as DEMAND, and disables any fuel save command line so that if the unit is functioning as a trail, it will not activate the relays that cause either half power or idle conditions to function. It then moves into block 501 which sets up an initial delay and falls through block 502 which is designated tweak watchdog. This is an OUT 4 command as executed in the software listing which "tweaks a watchdog" by causing an output command on the N$_2$ line (FIG. 2) which momentarily toggles latch 202 placing a charge on capacitor 207. The system stays in this loop until the delay is completed and in order to insure that the capacitor is fully charged the watchdog circuit will not again function for approximately 3 seconds due to the time constant of capacitor 207 and resistor 206a. The system is designed so that if the watchdog is not tweaked at least once in a 3 second interval, this will be insufficient to maintain a charge on capacitor 207 and the system will reset since this is undesirable. The hardware and software design is such that if the system is operating normally, the watchdog circuit will be triggered at least once each 2 second interval. Failure to accomplish this implies some form of microprocessor or program failure and the watchdog circuit will cause a system restart. During the restart operation, the system will fully charge up the capacitor 207 while executing a loop around block 502.

The program moves into an area where subroutine parameters are initialized and various data pointers are set up (block 504), the watchdog is again tweaked (block 505), and the system reaches a decision point where it determines whether it is a lead or a trail unit (block 506). The lead/trail decision is made based on the state of the flag 3 and is a hardware function appearing on FIG. 3, wherein line 90 goes to the processor and connects to the EF3 input of the processor. If the unit is a lead unit, the program flow moves to block 508 where the state of another flag is determined. The flag 2 (EF2) is connected to the output of a divider chain (FIG. 11) which is operating at ½ cycle per second so that every two seconds this output will go high. The system is thus synchronized to a two second interval when acting as a lead and if the two second interval has not elapsed, it then branches around back to the home position 520 and again tweaks the watchdog and makes a lead decision. It will operate around this loop until the two second interval begins at which time the function of bringing in the speed setting is accomplished. These inputs are bought in and debounced at block 509; i.e., the previous speed setting is compared with the existing speed setting and the two must agree in order to preclude any speed settings that might be entered during the time that the speed setting was being changed manually by the operator.

If the speed setting is stable, it is stored in a RAM register inside the microprocessor system and the program function then moves to the next block, which is shown as 510, where the speed of the locomotive is computed by measuring the frequency of an input signal from the wheel tachometer mentioned previously. Alternatively, this speed could be derived from some other means such as a radar unit which generates a frequency corresponding to ground speed. Following the measurement of speed, which is basically an interrupt frequency counting routine over a fixed time interval of approximately 1.2 seconds, the most recent speed is placed in a first-in/first-out register array deignated as FIFO and is updated in the FIFO. Block 511 shows a block diagram of a function which replaces the oldest speed with the next oldest speed in a FIFO array. In the present invention, the results of nine successive speed measurements are put in the FIFO, which represents an 18 second time interval since this event occurs only once every two seconds. Therefore, the FIFO array will hold as its latest entry the most recent speed entry and the oldest entry in the FIFO register will be a speed entry 18 seconds old.

The acceleration of the system is calculated by subtracting the oldest speed measurement in the FIFO from the newest speed. If the newest speed is greater than the oldest speed then acceleration is positive. The system then converts the binary speed measurement which is accurate within 1/10 of a mile per hour but is in a binary 16 bit range maximum number. Routine 512 converts this binary number to BCD and displays in units and tens of units miles per hour to the operator. The program then moves to block 513 which operates to determine if the unit is in the fuel save operating mode. There are various inputs that can determine this. For example, if the input of an override button has been pressed in the last 60 seconds by the operator, the unit will not be in the fuel save mode. Neither will it be if in dynamic brake or if in a lower throttle position. Only if all these conditions are satisfied so that the input override is not activated, the dynamic brake is not applied and the unit is in a high throttle position will the control enabled branch decision 514 enable the speed control logic block 516. If the control is disabled, the software will function through block 515 which will serve to increase DEMAND to maximum, thereby returning all locomotives to the throttle condition set by the operator in the lead locomotive and disabling fuel save functions in all locomotives of the consist.

The results of the speed control logic 516 will be such as to change the DEMAND to a value which will control the power of the consist. For example, the total number of demand units available is two per locomotive in the consist. Due to the construction of this invention, the lead unit is able to determine how many trail units are in the consist because the trail units answer its interrogation. Therefore, for example, if three units are in the consist, then a total of six demand units are available with two demand units being deemed full power, one demand unit being ½ power and 0 demand units being in the idle condition. The lead unit is thus able to determine how many demand units are available after it outputs the command cycle to trail unit. The speed control logic determines what, if any, change is made for the demand number as related to the maximum demand units available. For example, if the total number of demand units available is six and a power output decrease is deemed by the lead unit, then the DEMAND output parameter will be decreased.

The train control signal output, which is block 517, is the software function which implements the command cycle shown in FIG. 12. During the command cycle, the appropriate command pulses are issued to the corresponding trail units so that they will operate at the demand level computed by the speed control logic 516. During this cycle, as mentioned previously, all trail units report their status as well as whether or not they are in service, which makes the total number of demand units available to the microprocessor and reports on their condition to the lead unit. Following this cycle, software block 518 operates to output to the appropriate LED indicators the status of all units, including the lead and trails.

Following a display of an update of the status of the train, the program branches back to the home position through the connection indicated at 521. At the home position 520, the software again tweaks the watchdog (block 505) and passes through the lead/trail decision 506 and waits for the next two second interval by looping around decision branch 508 until this condition is valid. Should the unit be a trail unit as determined by the air brake switch mentioned previously, the lead/trail control line 16 (FIG. 3) will change the state voltage on line 90 so that the software will detect a trail condition at branch 506. It will then execute the trail logic, block 507, go to the home position again through 522 and continue to tweak the watchdog. Block 507 is the trail logic and controls the fuel save one and fuel save two outputs of that trail unit and reports the status to the lead unit as will be discussed infra.

Figure 18:
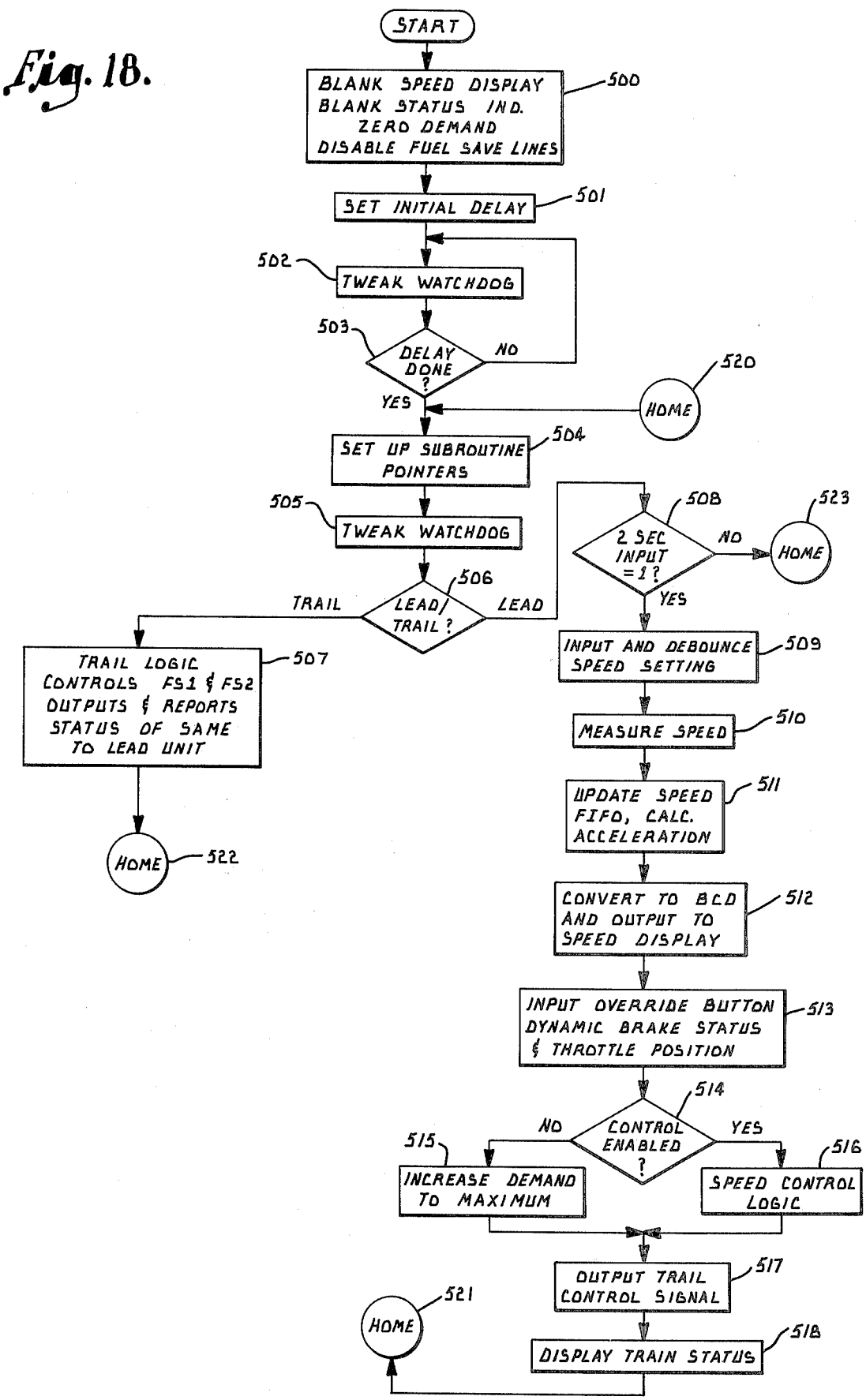
FIG. 18 is an overall flow diagram of the software program which is used to control the operation of the microprocessors.
Figure 19:
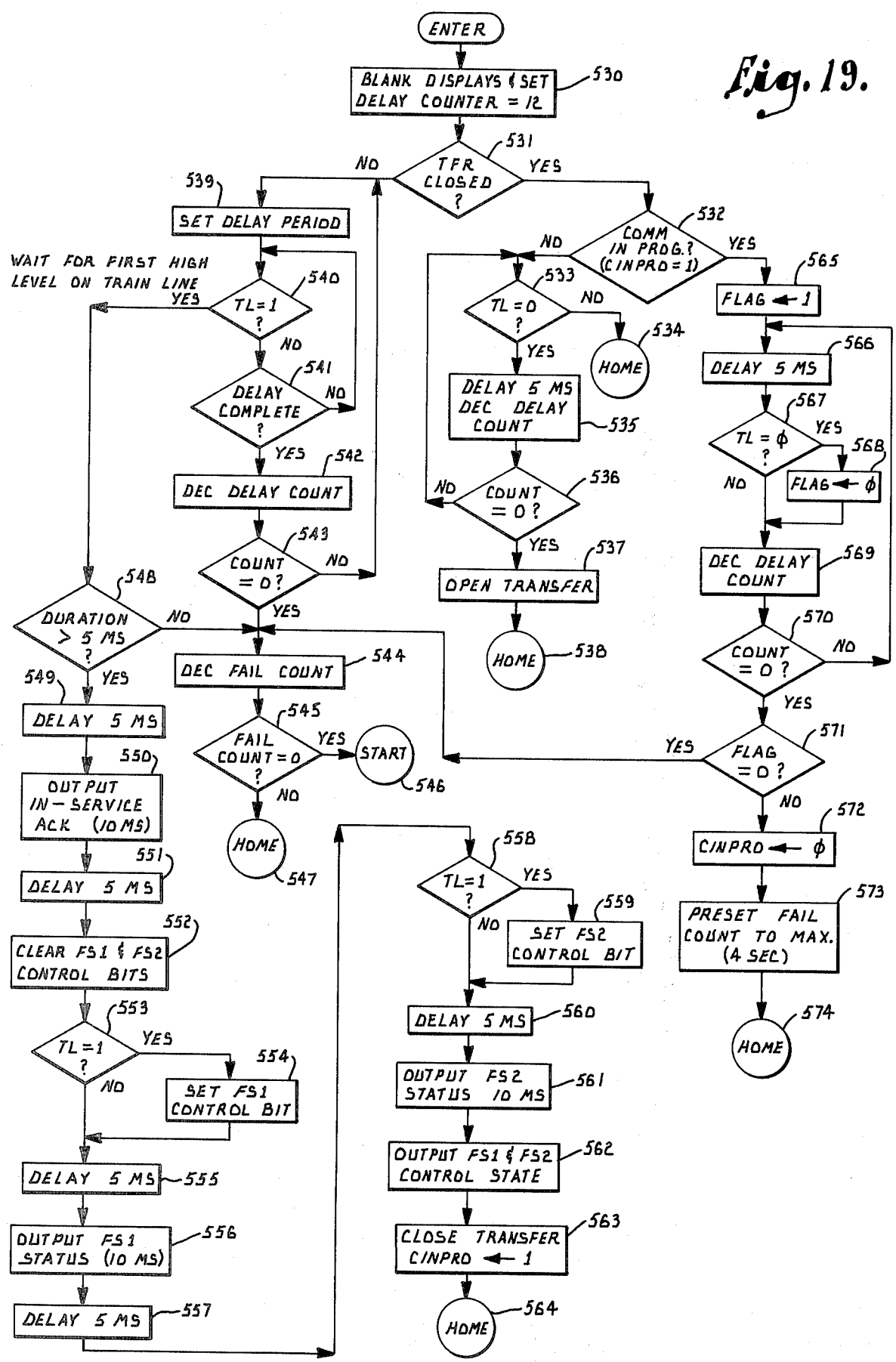
FIG. 19 is a detailed flow diagram of the software relating to the trail logic.

FIG. 19 refers to the trail logic and depicts in detail the functions shown on 507 on FIG. 18. On entry into this section the routine 530 blanks a display and sets a delay counter to the number 12. Then block 531 is encountered where a memory location is checked to determine if the transfer switch is closed between the train lines. This transfer switch has been described earlier and represents the state of transistor Q2 (FIG. 3) which in turn is dependent on the state of line 135. When power is supplied to the unit, the transfer switch is normally brought up in the closed state as an initial condition. However, if this is not the case, the system will be able to eventually compensate, as will be explained. Assuming that the transfer switch is closed and that thus far no communication has taken place to the trail units from the lead unit, block 532 will detect "no" state, i.e., no communication is in progress. The state of communication in progress is a memory location which is designated as CINPRO, where CINPRO=1 has the meaning that communication is in progress. If communication is not yet in progress, the branch at 532 will be to the no condition, block 533. If the train line is in the high condition, that is greater than 45 volts as detected by the trails, the test in block 533 will be in the no condition and the system will branch via 534 back home again as shown in FIG. 18. The system will continue to traverse the loop just mentioned from home, tweaking the watchdog, entering FIG. 19 to block 530, branching around through blocks 531, 532 and 533 back to home. As previously mentioned, a zero condition to the trail unit is any voltage less than approximately 45 volts.

Referring to FIG. 12, when the trail system is in a condition where it is waiting for the 60 volt pulse to go to zero, the time is designated as event "cycle start". At the start of the command cycle the lead unit will change the state of its Q line so that the 60 volts it has been holding on the train line goes to zero. The communication protocall is such that this level will be held at zero for 16 intervals of 5 milliseconds each until the first communication pulse from the lead unit is generated. During this time, the duration of the low state is tested on FIG. 19 in all trail units by the block 533 which will now fall through in the "yes" state. It will delay 5 milliseconds in block 535, decrement the delay count which was initially set at 12, and block 536 will branch back or fall through depending on whether the count of 12 has been reached or not. In this way, it requires 12 successive tests of the train line, 5 milliseconds apart at the zero state to fall through block 536 to block 537, at which time the trail system will open the transfer between itself and any succeeding trail unit, following through then into point 538 which connects back to the home position on FIG. 18.

At this point, the lead unit has started the cycle with a low condition on the train line (TL=0) of 12 plus delay intervals and all trail units connected with the train line have opened their transfer switches and isolated all but the trail unit immediately nearest the lead unit from the lead unit. When the processor steps through the program in the trail position, it will now come to block 531 and find the transfer switch is no longer closed. It will thus branch to the left to block 539 which sets up a delay period and the system will wait by testing block 540 (train line=1?) to block 541, determine if the delay has been completed Test 541), and branch back to the top of block 540. This delay count will be the same count referenced earlier which has been preset to 12, and it will decrement down to zero if a first pulse 330 (FIG. 12) from the lead unit is not detected.

The program also utilizes a fail counter which will be decremented down by one if the above condition occurs. If the fail count is not zero at block 545, the system will again return to the home position through connection 547. If the fail counter reaches zero, the system will vector to the start condition 546 which means that the low condition of the train line has been detected for an exessive length of time indicative of some system failure. The start condition as mentioned earlier will then disable all fuel save controls from any lead or trail unit. Normally, the system operation would not be such that the fail count of zero would ever be reached because the system would not normally remain in this condition for a length of time sufficient for this to take place.

During normal operation, the 60 volt train line condition (TL=1) will be detected at block 540 prior to the fail counter decrementing down to zero, and the system will branch to block 548 which tests to see if the (TL=1) condition persists for at least 5 milliseconds. This means that at least one half pulse width must occur from the lead unit in order for a valid interrogation signal to occur, and this serves to cause the system to ignore any momentary spikes or high voltage noise of short duration on the train line. If the duration is less than 5 milliseconds, branch 548 takes the system into block 544 which decrements the fail counter as previously discussed and vectors back again to home or start position, depending on the status of the fail count. Should the duration be 5 milliseconds, the function will fall through block 548 to block 549 which adds an additional fixed delay of 5 milliseconds and arrive at the point in time which corresponds to the trailing edge of pulse 330 on FIG. 12. The trail system then outputs an inservice acknowledgement pulse shown functionally as block 550 on FIG. 19 and shown as pulse 331 on FIG. 12. This pulse is of 10 millisecond duration.

The operation is then delayed another 5 milliseconds by block 551 which puts it in the middle of the sampling instant of the following lead command pulse. If the lead unit commands that this trail unit be in fuel save one condition, then it will output a 10 millisecond, 60 volt command pulse. The block 551 has insured that the time at which the trail unit will sample this pulse is in the middle of the pulse so that no race in time is involved. Block 552 then acts to clear the fuel save one and fuel save two control bits which are in the microprocessor RAM 162 (FIG. 9). Block 553 tests to see whether a 60 volt command pulse from the lead unit is present at this instant of time. If it is, the branch is taken to the right and to the block 554 which sets the fuel save one control bit in RAM 162. The program rejoins the other branch and enters a delay block 555, which takes the program to the point where the status of fuel save one in this trail unit could be enunciated. If fuel save one condition is enabled as detected by the system (denoted by a high voltage condition on line 27, FIG. 1), the acknowledgement 333 (FIG. 12) of 10 millisecond duration will be emitted. This function is schematically depicted in block 556. Following this, a 5 millisecond delay is again generated by block 557 and, as in the case of the fuel save one control bit, the fuel save two bit is set depending on the state of the lead unit command pulse 334 (FIG. 12). The delay of 5 milliseconds is again enabled, block 560, and the status of the trail unit fuel save two command is transmitted back to the lead unit in block 561, as represented in FIG. 12 by the fuel save acknowledgement signal 335.

This completes the transmission and the involvement of this unit in the command sequence, and block 562 outputs the state of the control bits, fuel save one and fuel save two to the hardware (Latch 134, FIG. 2), and the appropriate command to the locomotive is enabled electrically at this moment in time. The program then executes to block 563 which closes the transfer switch between units so that any subsequent high pulses from the lead unit will be transferred to the following trail units. Another RAM state flag which was mentioned earlier as CINPRO is now set to the one state meaning that the software later will branch at block 532 to the yes condition. The system then goes home at connection 564.

On the next pass through the trail logic, the unit will and now find the transfer closed at decision block 531. At block 532 it will find a communication is in progress and will enter block 565 where it sets a flag to the one position. It will then wait and loop at 566, 567, 569 and 570 for a condition when the train line is a one for 12 successive 5 milliseconds delay periods, denoting that the end of communication has taken place. If at any time during the 12 loops around block 570 the trail line voltage is zero, then the flag will be set to zero at block 568 so that at the end of the 12 loops around block 570 the system will encounter decision block 571. If the flag was at zero meaning that the train line was zero, sometime during the 12 cycles of the loop, this is interpreted as communication still in process to following trail units and the system will branch out to the yes side of block 571 to decrement the fail counter 544. If the fail counter 544 is non-zero, the system branches back to home at 547. It will execute this path through blocks 531, 532, 565, 570, 571 and back to 544 for as long as communication takes place or the train line does not maintain a one state for at least twelve 5 millisecond delay periods. At the end of communication when the lead unit has communicated with all trail units, the train line will go to the one state and remain there at the 60 volt level. This means that as the system comes through the 565, 566, 567, 569, 570 loop it will always find the train line in the one state and 571 will be exited in the no branch, thus signifying to the unit that communication has ceased and the CINPRO flag will be set to zero in block 572. In addition, this signifies the end of the cycle and the fail counter which was previously discussed will be set to a count of 67, which is its maximum value, and normally will require about 4 seconds to decrement down to zero through the loops that have been discussed. Following the preset of the fail counter to maximum, it will exit the flow chart shown in FIG. 19 through block 574 and return home.

FIG. 20 is a detailed flow chart of the speed control logic shown as block 516 in FIG. 18. By way of background concerning the function of the speed control logic, the locomotive consist when under the control of the speed control logic may have power added or taken away, or in some cases maintained at its present level. The control system of the present invention is designed so that two available demand units are included for each locomotive in the consist. The demand unit is in two parts: one is a full power demand setting and the other is a half power demand setting. If the demand is zero for a particular locomotive, it will be commanded to be in idle position. It is the function of the speed control logic to compare the actual speed of the train against the speed setting dialed in by the operator and to consider the speed and acceleration of the system in determining whether to add or subtract from the power setting of the total consist. When the train is below the speed setting, for example, it is not necessary to add more power if the train as a whole is accelerating and in fact if the train is approaching the set speed at a relatively high acceleration, it is highly possible that the train speed will overshoot the speed setting and actually reach a speed considerably in excess of the setting before the power is reduced enough that the consist comes back down to the set speed. Therefore, it is one of the functions of the speed control logic to anticipate the changes of the train in speed and change the total power setting accordingly.

Referring now to FIG. 20 in more detail, the speed control logic is enters at location 600 and the first action is to consider the value in a wait timer 601 which is a register in the microprocessor. This wait timer 601 is set at block 630 to the value of 8 by a change in the demand setting. The wait timer is decremented to zero in another portion of the logic (not shown in FIG. 20) at the rate of one count every two seconds. Thus, if the wait timer is set to the value of 8 it will not reach zero until 16 seconds later. The wait timer serves an inhibitory function to prevent rapidly successive speed changes before it is determined whether the changes in demand have an effect on the speed of the train. Referring to block 601, a decision is made as to whether the wait timer is greater than the value of 5. If it is greater than the value of 5, no further change in demand level is contemplated by the speed control logic and the system branches around the left side of the diagram to the exit 631.

Assuming that the wait timer previously has been set to the value of 8 by some previous change in the demand setting, block 601 requires the elapse of at least 6 seconds interval from that change in demand setting until the right hand branch out of block 601 will be taken. After the 6 seconds has elapsed and the wait timer has now decremented down to 5 or less, the program branches to block 602 which compares the manual setting of the operator speed to the speed of the train as determined by the speed in measuring block 510 in FIG. 18. This value has been stored in the microprocessor memory and is now compared against the manual setting value to determine the velocity error between the train speed and the speed setting. This difference value is stored as an absolute velocity error on block 602 and is shown as VERR. Block 603 tests the comparison of setting to actual velocity and if they are within one mile an hour, such as would be the case if the speed were 23.6 and the setting were 23, then the condition of the two being identical would be satisfied and block 603 would cause a branch to the left side which would branch to block 604. Block 604 makes the test as to whether acceleration is zero and if it is, the system branches again to the left and exits without a change in demand. Thus, if the speed is within one mile an hour of the set speed and there is no acceleration, no change is effected in the power of the system. Acceleration is calculated as the difference in tenths of a mile per hour speed in an 18 second interval, so that when a notation acceleration of 3 is mentioned, the speed has changed 3/10 of a mile per hour in 18 seconds.

If the acceleration is non-zero, then the program will branch from block 604 to block 605 which gets the tenths digit of the mile per hour speed and subtracts one half mile per hour from that number to determine if the speed is in the upper half mile an hour or the lower half mile an hour of the speed setting. For example, if the speed is 23.6, and ½ mile per hour is subtracted, the result will be greater than zero at block 607 and the code will branch to the right to connection 608 which is designated LES PWR. If the result is not greater than zero, meaning the speed is in the lower half mile per hour, then the block 607 will branch downward to connection 609 which is designated as MOR PWR.

Returning to block 603, if the speed setting is not within one mile per hour, the system will branch to test block 610 which determines whether the speed is greater than the setting. If the speed is greater than the setting, meaning that there is at least one mile an hour ifference between the setting and the train speed, block 610 will branch to the left to the point 611 LES PWR. Since actual speed is greater than the speed setting, less power on the locomotive consist is desirable. Block 613 now tests to see whether acceleration is negative. If the acceleration is negative, the train is already in the process of slowing down and it is possible that a further reduction in power is not desirable, so block 613 will branch out the bottom on the yes branch to check the value of the velocity error. In this case, if the velocity error is not greater than two miles per hour and acceleration is negative, block 614 will branch to block 615 which will check to see if there is a high negative acceleration. The question is asked at block 615 if the acceleration is less than −15 in value. If it is less than −15 in value, it means that the train is within 2 miles an hour, is slowing down rapidly, and there is actually the possibility that an increase in power may be desirable. For example, where this condition might occur is when the train consist has gone down a hill and obtained a speed that was greater than the setting and has now begun to travel uphill. The train is rapidly slowing down as evidenced by the large value of negative acceleration detected at test 615, so that even though the train is travelling faster than the speed setting, there is a need to increase the power of the consist rather than decrease it in order to somewhat anticipate the events that are going to occur and thereby maintain the train as close to constant speed as possible. Thus the system will branch out to an increase demand 1 (INCDR 1) connection 616 which will take it to block 651. Block 651 will check to see if the demand is equal to the total available units of demand. If not, block 652 will branch to the left and increase the demand level by one at block 654 and load the value 8 into the wait timer at block 630 before exiting block 631.

Returning to block 613, a situation may arise where the train is not in the process of slowing down, in which case the acceleration will not be negative. If the train is traveling faster than the speed setting, decision 613 will branch to the left and join the drop demand (DROPDM) block 612 and will move to decision 623 which will determine if the velocity error is greater than one. If the velocity error is greater than one, the system branches again to the left and immediately drops demand at 629 if block 628 shows some demand left. The function of block 628 is to prevent the dropping of demand level below zero. Block 629 will decrease in demand by one, and the value 8 will again be entered in the wait timer.

If the velocity error had been within one mile an hour, the system would have taken the branch to the right from block 623 to decision 625 which would have determined if the wait timer was greater than 3. As previously indicated, the system was entered at 601 with the test as to whether the wait timer was greater than 5. It was not greater than 5 and now a test is being made at 625 to determine if it is greater than 3. If it is greater than 3, the system exits at 653 with no change in demand. This process has the effect of delaying a change in demand by an increasing amount if the velocity error is small. Thus, if the velocity error is greater than one, the system is able to change the demand within 6 seconds from the previous change in demand. If the velocity error is not greater than one, then a 10 second wait, that is the delay from the time the wait timer counts down from 8 to 3, is required in order to change demand. If the velocity error is not greater than zero, the wait timer must wait until the block 627 indicates a zero value in the wait timer prior to change in demand. This means that a total of 16 seconds must elapse for a change of demand if the velocity differential is zero miles per hour, not considering the 1/10 mile per hour digit.

The branches 614, 615, 617, 618, 620 and 621 thus function to increase the power of the system if it is slowing down rapidly even though it might be in excess of the speed setting. The more rapidly it is slowing down, the further away from the desired setting the system will permit an increase in demand setting. There is a converse function on the blocks 634, 635, 636, 638, 639, 641, 642, 644 and 645 in the section of the flow chart which corresponds to the situation where the speed of the consist is below that of the setting and yet the train is accelerating rapidly toward the desired setting. In this case, the latter block functions act in such a way as to decrease the power of the consist in advance of reaching the desired speed setting and in such a way that the larger the velocity error, the more positive acceleration is required to decrease the power demand to the consist. If the system is operating at a speed below the setting but not accelerating rapidly towards the setting, then the program will arrive at block 647 and then test the wait timer 648 to determine if an increase in demand is deemed necessary. Blocks 647, 648, 649 and 650 act in a manner very comparable to blocks 623, 625, 626 and 627 except that they are in a position to increase the demand value rather than decrease the demand value.

Figure 21A:
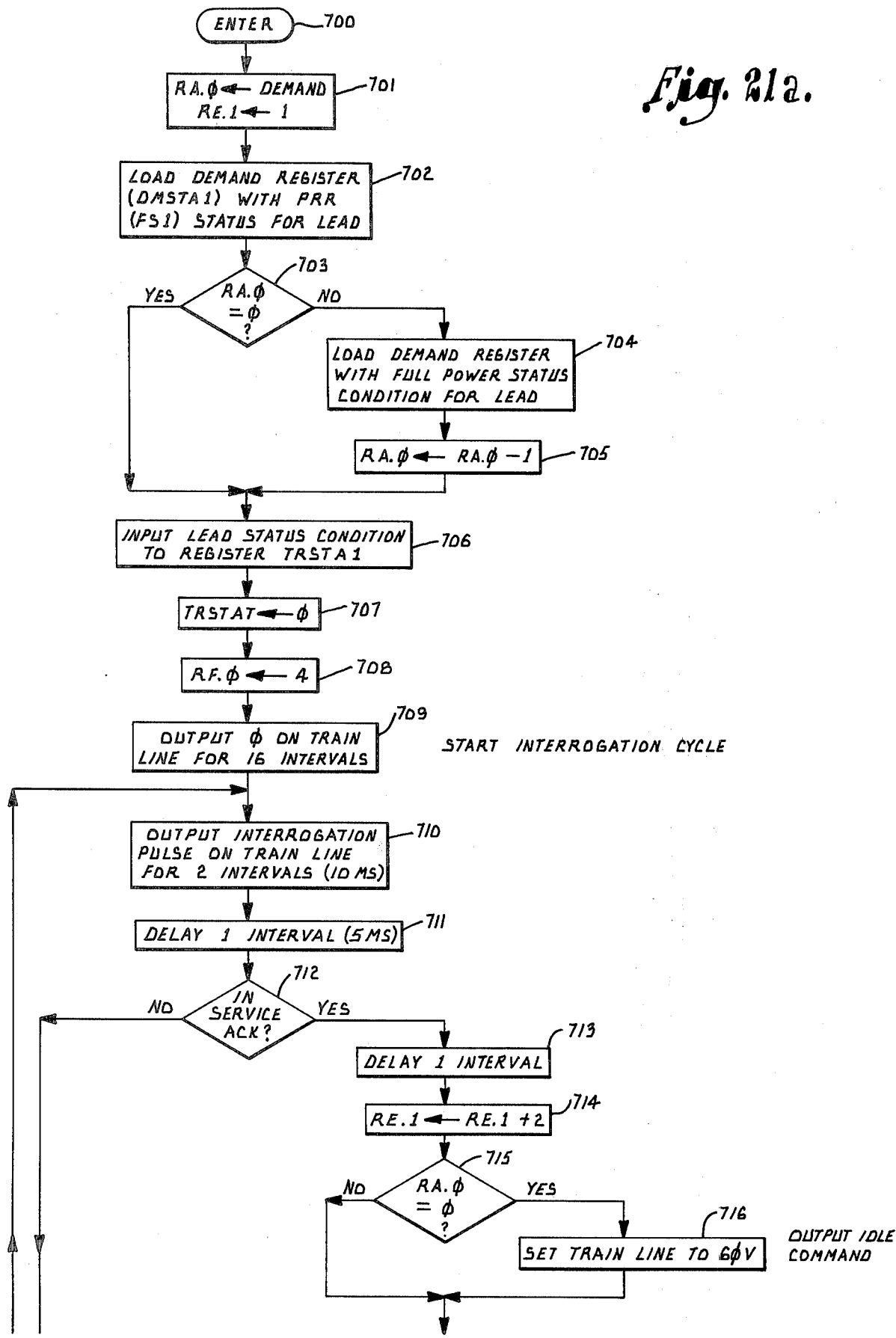

FIGS. 21a and 21b together represent a detailed flow chart of the train control logic which is indicated as block 517 in FIG. 18. This control logic serves to output to the locomotive consist control signals maintaining it at the power level determined in the speed control logic, as previously discussed. The train control logic also has the function of interrogating the trail units and determining how many trail units are in the consist and thusly determining what the available maximum demand level is.

On entering the train control logic flow chart, block 700, the system takes a number (a quantity previously referred to as demand) and transfers it to register A.0. It also presets register E.1 to the value of one. Register A.0 is used to determine the state of all locomotives within the power consist, while register E.1 is set to one in order to give it the available demand of the lead unit (considered here as one rather than two as previously discussed). One reason for this is that it has been determined by testing that it is usually undesirable to completely shut down all units in the locomotive consist because of back lash problems in the train when power is applied. It is thus preferred that the least power setting of the locomotive consist be that in which all trail units are idle and the lead unit is at half power. Consequently, the lead unit is assigned an available demand of only one rather than two, so register E.1 is preset to the value of one.

In block 702 an area of memory designated as demand status 1 (DMSTA 1) is tentatively loaded with the power reduction status of the lead unit. Then block 702 tests register A.0 to determine if it is zero. For example, if the demand setting of the system was for zero power as determined by the speed control logic, then at this point register A.0 would be zero. If register A.0 is not equal to zero, then at least one demand unit of power is available and the demand register DMSTA 1 is loaded with the full power status condition for the lead unit. If the demand is zero, then the lead unit is in the power reduction mode at ½ power. If the demand is one or greater, the lead unit is always at full power. Then block 705 decrements the RA.0 register by one, meaning that one demand unit has now been used from this point in determining the total, and the system moves to block 706 which inputs the lead status condition to a register train status 1 (TRSTA 1).

Another register called TRSTAT or train status is cleared in block 707. TRSTAT (block 707) is used to accumulate the status of the trail locomotive as the interrogation process proceeds. In this particular implementation of the invention the software is designed for a total of five locomotives, one lead and four trails, although any number of locomotives can be employed. Block 708 loads register RF.0 to the quantity of four which means that the following program loop will be traversed four times. Register RF.0 will be used as a counter if this happens. Block 709 causes the train line to go to the 0 state for 16-five millisecond intervals. The function in block 710 corresponds to the start of a cycle in FIG. 12 where the train line goes low for a 16 interval duration. As discussed previously, the transfer switches of all trail units open after 12 intervals because of the long duration zero output on the train line. The program moves into block 710 which outputs an interrogation on the train line for two intervals or 10 milliseconds. This corresponds to the pulse 330 in FIG. 12. A delay of one interval or 5 milliseconds in block 711 is then executed so that the lead unit samples the train line at the center of a trail acknowledgement pulse (331) if one is present.

Block 712 tests the state of the train line at this instant in time to determine if there is an in-service acknowledgement from a trail unit present. If there is an in-service acknowledgement, the system branches to the right to block 713. If there is no in-service acknowledgement, there are no trail units in service at this time, and the system branches around to the left to block 738 (FIG. 21b) where it decrements the R.0 counter which was previously set to the value of four in block 708.

Returning to block 713, following the delay of one interval, the first fuel save command from the lead unit is output, if required. This corresponds to pulse 332 in FIG. 12. The register RE.1 will be increased by two at this point in block 714 due to the fact that a trail unit has been detected by its acknowledgement, indicating that two more demand units are available in the locomotive consist. If the system reaches this point in the flow chart the first time, there is at least a lead unit and one trail in the consist so the total demand available will be increased to the value of three by block 714. Then block 715 tests to see whether any demand for power is remaining. If register RA.0 is found to be zero at test 715, there is no further demand for power of the locomotive consist. If that is the case, the system branches to block 716 which sets the train line at 60 volts prior to executing delay block 717, corresponding to an idle command output to that trail unit. If RA.0 is not zero, there is still some demand for power, so the system executes block 717 which effect a two interval delay with the train line output at zero volts.

Following block 717, the train line is unconditionally set to zero volts by the lead program at block 719 preparatory to testing the status reply from the trail. Block 719 delays one interval so that the test 720 will occur in the center of the sampling interval of the possible pulse from the trail unit. If an acknowledgement in the form of a 30 volt pulse from a trail is detected at block 720, the TRSTAT register 707 is shifted left and a one is shifted into the least significant bit by block 722. If there is no acknowledgement of the fuel save one test, then a zero is shifted into the TRSTAT register 707 at block 721. The purpose of this shift is to build up an 8 bit array which is used to turn on or off the 8 LEDS on the front panel of the unit which indicates the status of the four trail units. It will be recalled that each trail unit has a red and green light indicating its status.

The program then executes the block at 723 which delays one interval. The point in time at which the trail unit is to respond has been passed, and again a test is made of demand at block 724. If RA.0 is zero, then there is still no further demand. However, if it is not zero, it may have the value of one or greater than one which is tested by block 725. If the demand remaining at this point is exactly one at block 725, the program moves to block 727 which outputs a ½ power command to the trail unit by setting the train line at 60 volts. This corresponds to a high level pulse at the point 334 in FIG. 12. If the remaining demand is not exactly one (two or greater), the system does not place this trail unit in the ½ power condition but instead leaves the train line at 0 volts by branching to block 726 and subtracts the one unit of remaining demand from register A.0.

Block 728 is then entered and another unit is subtracted so that a total of two units of demand have been subtracted. Thus, if two units of demand are required, on entry to this loop at 710, the trail unit that is being commanded remains at full power and two demand units from the total are subtracted. If the system is entered with a total of two demand units, then the following trail is reset to zero power but two units of demand are used up in the trail unit closest to the lead unit. If only one unit is remaining, then the program branches to the right at block 725, and block 727 provides a ½ power output command and subtracts one unit at block 728, leaving the result at zero, and that trail unit is left at ½ power. Block 729 delays two intervals to provide time for output of the command pulse.

At the end of pulse 334 (FIG. 12), the train line is reset to 0 volts at block 730 in preparation for a possible second fuel save acknowledgement 335 from that trail unit. A delay of one interval is executed in block 731, and block 732 makes the test as to whether pulse 335 is at a high level. Block 733 determines whether the fuel save one signal was acknowledged, which was actually a test at block 720. A shift is then performed on the TRSTAT register at either 734 or 735, which in effect will later turn on either the red or green LED in that corresponding trail position. The designation in parentheses in block 734 indicates that the first 6 bits at this point are not defined and that the program here operates on the least significant two bits of the TRSTAT register. If this is not the last trail locomotive in the consist, then the two bits in the TRSTAT register will actually be shifted left on the next pass through this code as the bit pattern is built up for future display by the train status logic in block 518 (FIG. 18).

If there is no fuel save two acknowledgement from the trail unit at block 732, the program branches to the left to block 736 and shifts in a zero to the TRSTAT register. Block 737 delays one interval which completes the interrogation cycle for one trail unit. After having decremented by one in block 738, a test is made at block 739 to determine if RF.0 is zero. If it is zero, then four cycles have been completed either through block 713 if there was an acknowledgement or through the left side of block 712 if there was no acknowledgement. If RF.0 is greater than zero after having decremented the system branches back around to block 710 which outputs another interrogation pulse to a second trail unit. As previously indicated, the first trail unit will have re-enabled back its transfer switch so that the second trail unit can receive the lead unit signal at the instant of time immediately subsequent to pulse 335 (FIG. 12). If the interrogations are complete at block 739, four interrogations have been made, and the train line is set to a high level by block 740 and remains at a high 60 volt level until the start of the next interrogation cycle.

Following execution of block 740, the system exits this series of instructions at 741 and moves to block 518 (FIG. 18) where the trail status is displayed to the operator by a transfer of the bit pattern built up in the TRSTAT register to the train status LEDs. In addition, the total available count accumulated in register RE.1 now becomes the available demand of the system. For example, if the lead and only one trail unit are present, register RE.1 at the exit of FIG. 21 will have accumulated the value of three, indicating that there are three available demand units in the locomotive consist. If there were a lead and four trails, the RE.1 would have the value of 9 which is the available demand number referenced in FIG. 20 at block 652.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A control device for controlling a multiple unit locomotive system having a plurality of individual locomotive units each having high and low throttle positions and a plurality of discrete throttle positions between the high and low positions for normal operation of the locomotive system, said control device comprising:
   means for setting a predetermined set speed of the locomotive system;
   sensing means for sensing the actual speed of the locomotive system; and
   control means operable in response to the presence of a differential between the actual and set speeds to automatically and sequentially vary the throttle positions of the individual locomotive units between the high and low throttle settings thereof in a manner to effect substantial conformity of the actual speed with the set speed.

2. A control device as set forth in claim 1, wherein the power output of each locomotive unit has a full power level, a half power level and a minimal power level, said control means being operable to vary the output power of each individual locomotive unit incrementally among said full power level, said half power level and said minimal level.

3. A control device as set forth in claim 1, wherein the locomotive system includes a train line wire interconnecting the locomotive units, said control means being operable to send control signals for controlling the output power of each locomotive unit in both directions along said train line wire.

4. A control device as set forth in claim 1, including:
   means providing a measurement of the acceleration of the locomotive system; and
   means sensitive to the acceleration of the locomotive system for adjusting the output power of the locomotive units in a manner to compensate for acceleration in effecting substantial conformity of the actual speed with the set speed.

5. A control device for controlling the operation of a multiple unit locomotive system having a lead unit and a plurality of trail units each capable of providing output power to assist in propelling the locomotive system, said control device comprising:
   means for setting a selected set speed of the locomotive system;
   sensing means for sensing the actual speed of the locomotive system;
   electronic control means associated with the lead unit for transmitting a control signal to the trail units when a speed differential is present between the set speed and the actual speed of the locomotive system;
   receiver means associated with each trail unit for receiving the control signal; and
   electronic means associated with the receiver means of each trail unit for incrementally adjusting the output power of the trail unit under the influence of the control signal in a manner to effect a combined output power of the locomotive units sufficient to substantially conform the actual speed of the locomotive system with the set speed thereof.

6. A control device as set forth in claim 5, including means for visually displaying the set speed and the actual speed.

7. A control device as set forth in claim 5, wherein the locomotive system includes a train line wire interconnecting the locomotive units, said control signal being transmitted along the train line wire in both directions.

8. A control device as set forth in claim 5, including:
   means providing for the determination of the acceleration and deceleration of the locomotive system;
   means for preventing upward adjustment of the output power of the locomotive system when the acceleration is above a preselected level; and
   means for preventing downward adjustment of the output power of the locomotive system when the deceleration is above a preselected level.

9. A control device as set forth in claim 8, including means for adjusting said preselected levels in response to variations in the differential between the actual speed and the set speed.

10. A control device for controlling a multiple unit locomotive system having a lead locomotive unit and a plurality of trail units each capable of providing output power to assist in propelling the locomotive system, said control device comprising:
- means for setting a selected set speed of the locomotive system;
- means for sensing the actual speed of the locomotive system;
- electronic control means for transmitting control signals serially from the lead unit to the trail units when a speed differential is present between the set speed and the actual speed of the locomotive system;
- means associated with each trail unit for receiving the control signals and selectively placing the trail units in a fuel save mode of operation wherein the output power of the individual trail units is varied serially in incremental steps under the influence of said control signals to effect substantial conformity of the actual speed of the locomotive system with the set speed thereof; and
- means for applying an acknowledgement signal from each trail unit to the lead unit when the trail unit is placed in the fuel save mode of operation.

11. A control device as set forth in claim 10, including means for visually displaying which of the trail units are in the fuel save mode of operation.

12. A control device as set forth in claim 10, including:
- an air brake system for the locomotive system;
- a pressure switch for the air brake system associated with each locomotive unit, the pressure switch for the lead unit having one position and the pressure switches for the trail units having another position; and
- means for detecting the position of each pressure switch to distinguish the lead unit from the trail units.

13. A control device as set forth in claim 10, including means for preventing the trail units from receiving the acknowledgement signals.

14. A control device as set forth in claim 10, including:
- a train line wire in the locomotive system interconnecting the locomotive units;
- means for transmitting said control signals serially along said train line wire in both directions;
- means for applying said acknowledgement signals along said train line wire in both directions;
- means associated with each trail unit for receiving the control signals on said train line wire in either direction; and
- means associated with said lead unit for receiving the acknowledgement signals on said train line wire in either direction.

15. A control device as set forth in claim 14, including means for preventing the trail units from receiving the acknowledgement signals.

16. A control device as set forth in claim 14, wherein said control signals have one amplitude and said acknowledgement signals have another amplitude, said receiving means for the trail units being operable to accept signals having said one amplitude and to reject signals having said other amplitude.

17. A control device for controlling a multiple unit locomotive system having a lead unit, a plurality of trail units each capable of providing output power to assist in propelling the system, and at least one train line wire interconnecting the locomotive units in the system, said device comprising:
- means for setting a selected set speed at which the locomotive system is to travel;
- means for sensing the actual speed at which the locomotive system is travelling;
- electronic control means for transmitting sets of control signals periodically in both directions on the train line wire from the lead unit to the trail units when a speed differential is present between the actual speed of the locomotive system and the set speed thereof;
- receiver means associated with each trail unit for receiving the control signals in either direction on said train line wire;
- means for incrementally varying the output power of each trail unit individually under the influence of the control signals to effect substantial conformity of the actual speed of the locomotive with the set speed thereof; and
- means for applying an acknowledgement signal in both directions along the train line wire from each trail unit to the lead unit when the output power of the trail unit is varied in response to receipt of the control signals.

18. A device as set forth in claim 17, including means for preventing the acknowledgement signals from affecting the receiver means of the trail units.

19. A device as set forth in claim 17, wherein said means for varying the output power of each trail unit is operable to selectively vary the output power of each trail unit among a full power level, a half power level and a minimal power level under the influence of the control signals.

20. A device as set forth in claim 17, wherein each set of control signals corresponds to a different trail unit, and including means for responding only to control signals corresponding with the associated trail unit.

21. A device as set forth in claim 20, wherein said responding means includes:
- a diode bridge circuit for each trail unit coupled with the train line wire in a manner to receive signals in both directions therefrom and to transmit signals in both directions thereon;
- means for maintaining each bridge circuit in a condition to apply incoming control signals to the corresponding receiver means when the set of control signals corresponding to the associated trail unit is being transmitted on the train line wire; and
- means for maintaining each bridge circuit in a condition to prevent incoming control signals from reaching the non-corresponding receiver means and to direct incoming control signals away from the receiver means in both directions on the train line wire when control signals other than the set of signals corresponding to the associated trail unit are being transmitted on the train line wire.

22. Apparatus for controlling a multiple unit locomotive system having a lead locomotive unit and a plurality of trail locomotive units each having high and low throttle positions and a plurality of discrete throttle positions between the high and low positions for normal operation of the locomotive system, said apparatus comprising:

means for setting a predetermined set speed at which it is desired for the locomotive system to travel;

sensing means for sensing the actual speed of the locomotive system;

control means operable in a fuel save mode of operation to maintain each trail unit at either the high or low throttle position;

said control means responding to an actual speed greater than the set speed by successively dropping trail units to the low throttle position until the actual speed substantially coincides with the set speed; and said control means responding to an actual speed less than the set speed by successively raising trail units to the high throttle position until the actual speed substantially coincides with the set speed;

whereby the set speed is maintained with the trail units in either the high or low throttle position for fuel efficient operation of the locomotive system.

* * * * *